(12) United States Patent
Kurakake

(10) Patent No.: US 11,691,689 B2
(45) Date of Patent: Jul. 4, 2023

(54) FRONT TWO-WHEEL LEANING VEHICLE

(71) Applicant: YAMAHA HATSUDOKI KABUSHIKI KAISHA, Iwata (JP)

(72) Inventor: Haruhito Kurakake, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 37 days.

(21) Appl. No.: 17/334,520

(22) Filed: May 28, 2021

(65) Prior Publication Data
US 2021/0284271 A1 Sep. 16, 2021

Related U.S. Application Data

(63) Continuation-in-part of application No. PCT/JP2019/046866, filed on Nov. 29, 2019.

(30) Foreign Application Priority Data

Nov. 29, 2018 (JP) ................... 2018-224259

(51) Int. Cl.
*B62K 5/10* (2013.01)
*B62J 50/22* (2020.01)
(Continued)

(52) U.S. Cl.
CPC ............... *B62K 5/10* (2013.01); *B62J 50/22* (2020.02); *B62K 5/05* (2013.01); *B62K 5/06* (2013.01);
(Continued)

(58) Field of Classification Search
CPC ...................................... B62K 5/10
See application file for complete search history.

(56) References Cited

U.S. PATENT DOCUMENTS 7,226,062 B1 * 6/2007 Stefano .................. B62K 5/027
280/263
9,744,952 B2 8/2017 Seto et al.
(Continued)

FOREIGN PATENT DOCUMENTS

CN 104507790 A 4/2015
CN 104703870 A 6/2015
(Continued)

OTHER PUBLICATIONS

"Tritown", Yamaha Hatsudoki Kabushiki Kaisha, [searched on Oct. 1, 2018], Internet, https://global.yamaha-motor.com/jp/design_technology/design/concept/tritown/.

Primary Examiner — Paul N Dickson
Assistant Examiner — Shams Dhanani
(74) Attorney, Agent, or Firm — Rabin & Berdo, P.C.

(57) ABSTRACT

A front two-wheel leaning vehicle, including a handle, a steering shaft, a linkage mechanism and a load transfer mechanism. The load transfer mechanism includes a left-foot-placing part and a right-foot-placing part located between the left front wheel and the rear wheel, for left and right feet of the driver to be respectively placed thereon. The load transfer mechanism transfers a load to the left and right portions of the linkage mechanism through the left-foot-placing part and the right-foot-placing part, or through the right-foot-placing part and the left-foot-placing part, respectively. The steering shaft includes a handle adjusting mechanism configured to adjust, with respect to the left-foot-placing part and the right-foot-placing part, at least one of a handle height, which is a distance from a midpoint between the left and right front wheels to the grip, or an offset amount of the handle with respect to a rotation axis of the steering shaft.

6 Claims, 19 Drawing Sheets

(51) Int. Cl.
*B62K 5/05* (2013.01)
*B62K 5/06* (2006.01)
*B62K 5/08* (2006.01)
*B62K 23/06* (2006.01)
*B62K 5/00* (2013.01)

(52) U.S. Cl.
CPC ............... *B62K 5/08* (2013.01); *B62K 23/06* (2013.01); *B62K 2005/001* (2013.01)

(56) References Cited

U.S. PATENT DOCUMENTS

| | | | |
|---|---|---|---|
| 2010/0044977 A1* | 2/2010 | Hughes | B62K 5/10 |
| | | | 280/5.509 |
| 2014/0375015 A1 | 12/2014 | Yu | |
| 2015/0246704 A1 | 9/2015 | Takano et al. | |
| 2016/0318581 A1* | 11/2016 | Kim | B62J 45/41 |
| 2017/0088222 A1 | 3/2017 | Ohno et al. | |
| 2017/0144719 A1* | 5/2017 | Terada | B62K 5/05 |
| 2017/0210440 A1 | 7/2017 | Dragomir | |
| 2018/0178870 A1* | 6/2018 | Takeshita | B62J 50/22 |
| 2018/0281543 A1 | 10/2018 | Mori | |
| 2019/0210683 A1* | 7/2019 | Lin | B62J 3/14 |
| 2022/0204112 A1* | 6/2022 | Sun | B62K 3/002 |
| 2022/0306233 A1* | 9/2022 | Chee | B62K 21/06 |

FOREIGN PATENT DOCUMENTS

| | | | | |
|---|---|---|---|---|
| CN | 108502077 A | 9/2018 | | |
| EP | 2998209 A1 | 3/2016 | | |
| EP | 3150476 A1 | 4/2017 | | |
| EP | 3153392 A1 | 4/2017 | | |
| EP | 3184409 A2 | 6/2017 | | |
| EP | 3871966 A4 * | 12/2021 | ............. | B62J 11/19 |
| JP | S5948282 A | 3/1984 | | |
| JP | S59179466 A | 10/1984 | | |
| JP | 2006256401 A | 9/2006 | | |
| JP | 2007159776 A | 6/2007 | | |
| JP | 2015120360 A | 7/2015 | | |
| JP | 2016060470 A | 4/2016 | | |
| JP | 2016060471 A | 4/2016 | | |
| JP | 2017065527 A | 4/2017 | | |
| JP | 2017094906 A | 6/2017 | | |
| JP | 2017165147 A | 9/2017 | | |
| JP | 2018030516 A | 3/2018 | | |
| TW | 201834911 A | 10/2018 | | |
| WO | 2005075278 A1 | 8/2005 | | |
| WO | 2009059099 A2 | 5/2009 | | |
| WO | 2014046282 A1 | 3/2014 | | |
| WO | 2017086351 A1 | 5/2017 | | |
| WO | 2017208992 A1 | 12/2017 | | |
| WO | 2018211973 A1 | 11/2018 | | |
| WO | WO-2020111261 A1 * | 6/2020 | ............. | B62J 25/04 |

* cited by examiner

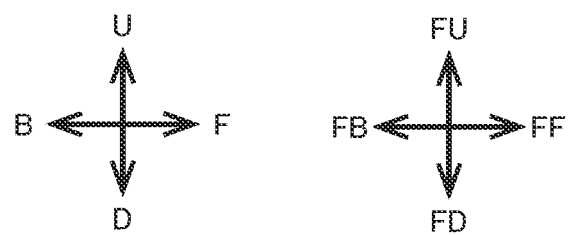
FIG. 12
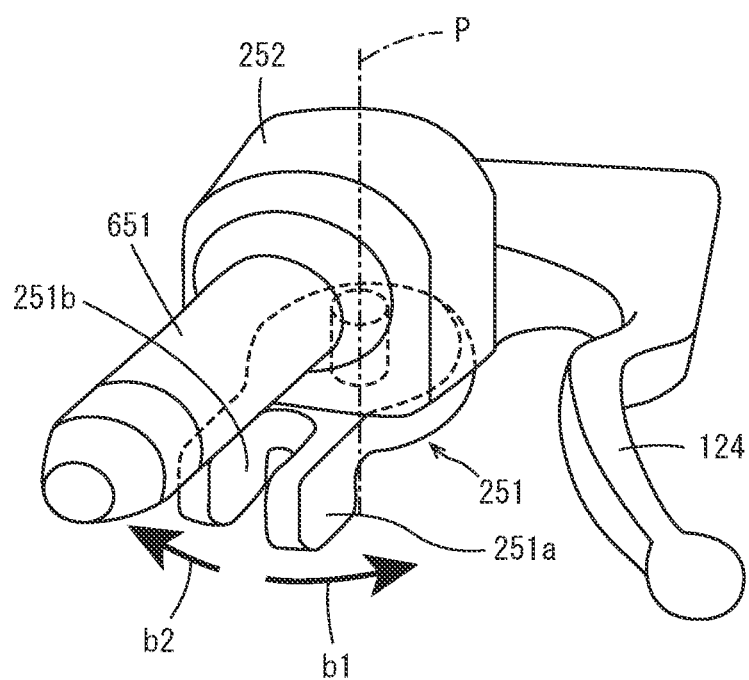

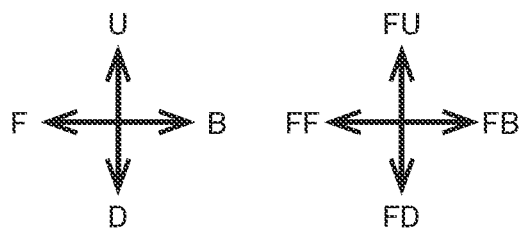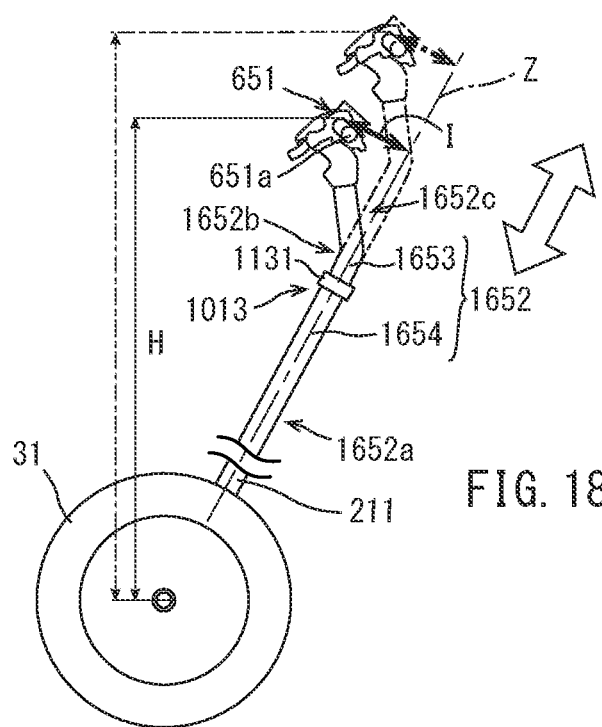
FIG. 18

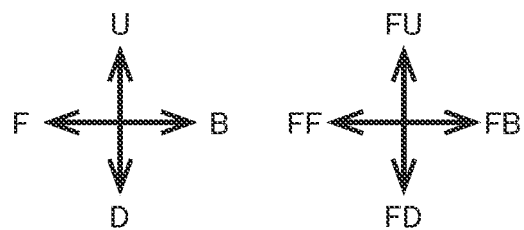
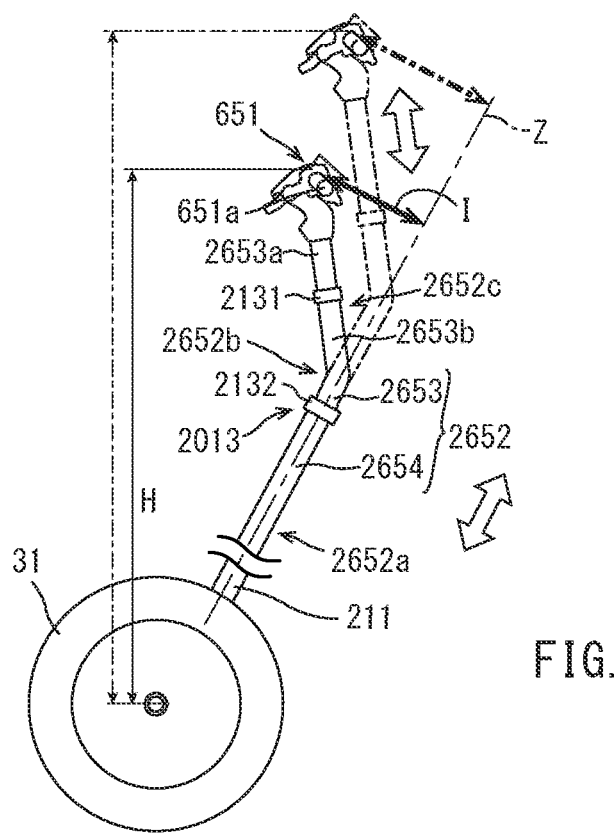
FIG. 19

FRONT TWO-WHEEL LEANING VEHICLE

CROSS REFERENCE TO RELATED APPLICATIONS

This is a continuation-in-part application of international application PCT/JP2019/046866, filed on Nov. 29, 2019, which claims priority from a Japanese patent application no. 2018-224259, filed on Nov. 29, 2018, the contents of which are incorporated herein by reference.

The present application is related to two co-pending applications, which are filed on the same date as the present application, and are continuation-in-part applications of international applications PCT/JP2019/046865 and PCT/JP2019/046877, both filed on Nov. 29, 2019, respectively.

TECHNICAL FIELD

The present teaching relates to a front two-wheel leaning vehicle.

BACKGROUND ART

There has been known a vehicle including a vehicle body frame, left and right front wheels disposed at the left and the right, respectively, when the vehicle is seen from the front, and a linkage mechanism. As such a vehicle, Patent Document 1 and Non-patent Document 1, for example, disclose vehicles each including a vehicle body frame, left and right front wheels, and a linkage mechanism disposed above the left and right front wheels and configured to change relative positions of the left and right front wheels relative to the vehicle body frame to cause the vehicle body frame to lean leftward or rightward of the vehicle.

The vehicle disclosed in Patent Document 1 includes a load transfer mechanism configured to include a left-foot-placing face on which a left foot of a driver of the vehicle is placed and a right-foot-placing face on which a right foot of the driver is placed, and configured such that a load is allowed to be transferred to a left portion of the linkage mechanism through one of the left-foot-placing face or the right-foot-placing face and that a load is allowed to be transferred to a right portion of the linkage mechanism through the other of the left-foot-placing face or the right-foot-placing face.

In the vehicle having the configuration described above, while the vehicle is stationary, the vehicle is balanced in the left-right direction by application of a load to the left-foot-placing face and the right-foot-placing face of the load transfer mechanism and movement of a handle in the left direction or in the right direction. On the other hand, while the vehicle is traveling at an extremely low speed, the handle is caused to turn about an axis so that the vehicle turns in the direction in which the handle is rotated.

The state in which the vehicle is stationary means that the speed of the vehicle is zero. The extremely low speed means a speed at which the vehicle is caused to turn not by leftward or rightward leaning of the vehicle but by rotation of the handle.

CITATION LIST

Patent Document

Patent Document 1: Japanese Patent Application Publication No. 2017-94906

Non-Patent Document

Non-patent Document 1: "TRITOWN", YAMAHA HATSU-DOKI KABUSHIKI KAISHA, [searched on Oct. 1, 2018], Internet

SUMMARY OF INVENTION

Technical Problem

In the case where the vehicle is balanced in the left-right direction by movement of the handle in the left direction or in the right direction while the vehicle is stationary or the case where the handle is rotated about the axis while the vehicle is traveling at an extremely low speed as described above, operational feeling of the handle is important. In view of this, in a speed range from the stationary state to the extremely low speed of the vehicle, enhancement of the operational feeling of the handle is demanded.

The present teaching has an object of providing a front two-wheel leaning vehicle capable of enhancing handle operational feeling in a speed range from a stationary state to an extremely low speed of the vehicle.

Solution to the Problem

The inventor of the present teaching studied a front two-wheel leaning vehicle capable of enhancing handle operational feeling in a speed range from a stationary state to an extremely low speed of a vehicle. Specifically, the inventor studied a front two-wheel leaning vehicle capable of enhancing handle operational feeling in a case where the vehicle is balanced in the left-right direction by movement of the handle in the left direction or in the right direction while the vehicle is stationary or a case where the handle is rotated about an axis while the vehicle is traveling at an extremely low speed.

The inventor found that since the positions of the feet of the driver is fixed with respect to a front two-wheel leaning vehicle, when the arms of the driver on the front two-wheel leaning vehicle rotate upward or downward, the center of rotation of the arms is uniquely determined. That is, the inventor found that since the arms of the driver rotate upward and downward about the shoulders, once the position of the feet of the driver with respect to the front two-wheel leaning vehicle is fixed, the range of rotation of the arms in the top-bottom direction is fixed.

On the other hand, the inventor noticed that the driver can easily operate the front two-wheel leaning vehicle at a certain handle position in a rotation range of the arms of the driver in the top-bottom direction. In consideration of operability of the front two-wheel leaning vehicle, the angle of elbows of the driver is preferably at a predetermined angle at which movement and rotation of the handle in the left-right direction are allowed. Accordingly, from the viewpoint of operability of the front two-wheel leaning vehicle, the handle position is preferably set at such a position that the angle of elbows of the driver is the predetermined angle described above.

The handle position at which the driver can easily operate the front two-wheel leaning vehicle as described above can be set by adjusting the handle position of the front two-wheel leaning vehicle in at least one of the top-bottom direction or the front-rear direction. That is, the handle position at which the driver can easily operate the front two-wheel leaning vehicle is an intersection point of a rotation range of the arms of the driver in the top-bottom direction and an adjustment range of the handle position.

In consideration of the foregoing points, the inventor has arrived at the configuration described below through an intensive study.

A front two-wheel leaning vehicle according to one embodiment of the present teaching is a front two-wheel leaning vehicle that leans leftward when turning left and leans rightward when turning right. The front two-wheel leaning vehicle includes: a vehicle body frame; a left front wheel located left of the vehicle body frame in a left-right direction of the vehicle body frame; a right front wheel located right of the vehicle body frame in the left-right direction of the vehicle body frame; a handle having a grip configured to be held by a driver riding on the front two-wheel vehicle; a steering shaft connected to the handle and supported by a front portion of the vehicle body frame, such that the steering shaft is rotatable about a rotation axis, the steering shaft being configured to rotate about the rotation axis together with the handle to steer the left front wheel and the right front wheel; a rear wheel located behind the left front wheel and the right front wheel in a front-rear direction of the vehicle body frame; a linkage mechanism supported by the vehicle body frame and configured to allow leftward leaning and rightward leaning in the left-right direction of the vehicle body frame, the linkage mechanism having a left portion and a right portion; and a load transfer mechanism including a left-foot-placing part located between the left front wheel and the rear wheel, for a left foot of the driver to be placed thereon, and a right-foot-placing part located between the right front wheel and the rear wheel, for a right foot of the driver to be placed thereon, the load transfer mechanism being configured to transfer a load to the left portion and the right portion of the linkage mechanism through the left-foot-placing part and the right-foot-placing part, respectively, or through the right-foot-placing part and the left-foot-placing part, respectively, wherein the steering shaft includes a handle adjusting mechanism configured to adjust, with respect to the left-foot-placing part and the right-foot-placing part, at least one of a handle height, which is a distance, in a top-bottom direction of the vehicle body frame, from a midpoint between the left front wheel and the right front wheel in the left-right direction of the vehicle body frame, to the grip, or an offset amount of the handle with respect to the rotation axis of the steering shaft in the front-rear direction of the vehicle body frame.

While the front two-wheel leaning vehicle is stationary, a driver balances the front two-wheel leaning vehicle in the left-right direction by moving the handle in the left direction or in the right direction. The movement of the handle in the left direction or in the right direction is affected by the handle height that is a distance in the top-bottom direction of the vehicle body frame from the midpoint between the left front wheel and the right front wheel in the left-right direction of the vehicle body frame to the grip. Thus, it is possible to change operational feeling of the handle in moving the handle in the left direction or in the right direction while the vehicle is stationary, by adjusting the handle height.

In addition, while the front two-wheel leaning vehicle is traveling at an extremely low speed, the front two-wheel leaning vehicle is caused to turn by rotating the handle of the front two-wheel leaning vehicle in some cases. The rotation of the handle is affected by the offset amount of the handle with respect to the rotation axis of the steering shaft in the front-rear direction. Thus, it is possible to change opera-tional feeling of the handle in rotating the handle while the front two-wheel leaning vehicle is traveling at an extremely low speed, by adjusting the offset amount.

As described above, it is possible to enhance operational feeling of the handle in a speed range from the stationary state to the extremely low speed of the front two-wheel leaning vehicle by adjusting at least one of the handle height or the offset amount.

In another aspect, the front two-wheel leaning vehicle preferably has the following configuration. At least one of the handle height or the offset amount is capable of being adjusted by changing at least one of a length of the steering shaft in the top-bottom direction of the vehicle body frame or a length of the steering shaft in the front-rear direction of the vehicle body frame.

This configuration makes it possible to easily adjust at least one of the handle height or the offset amount of the handle with respect to the rotation axis of the steering shaft in the front-rear direction of the vehicle body frame.

In another aspect, the front two-wheel leaning vehicle preferably has the following configuration. The steering shaft includes a steering-shaft-lower portion rotatably supported by the front portion of the vehicle body frame and extending from the front portion of the vehicle body frame both upward, in the top-bottom direction of the vehicle body frame, and rearward, in the front-rear direction of the vehicle body frame, along the rotation axis, a steering-shaft-bent portion bent forward, in the front-rear direction of the vehicle body frame, and upward, in the top-bottom direction of the vehicle body frame, with respect to the steering-shaft-lower portion, and a steering-shaft-upper portion extending from the steering-shaft-bent portion forward in the front-rear direction of the vehicle body frame and upward in the top-bottom direction of the vehicle body frame. The handle is connected to an upper end of the steering-shaft-upper portion. The handle adjusting mechanism is configured to change a length of at least one of the steering-shaft-upper portion or the steering-shaft-lower portion.

This configuration makes it possible to easily adjust at least one of the handle height or the offset amount of the handle with respect to the rotation axis of the steering shaft in the front-rear direction of the vehicle body frame. In addition, it is also possible to prevent interference of the handle with the driver in changing the positions of the handle in the top-bottom direction and in the front-rear direction with respect to the steering shaft.

In another aspect, the front two-wheel leaning vehicle preferably has the following configuration. The front two-wheel leaning vehicle further includes an electric component attached to the vehicle body frame; a terminal attached to the handle; and a wire including a curl cord located inside the steering shaft and electrically connecting the terminal and the electric component to each other.

In the case where the handle adjusting mechanism changes the position of the handle with respect to the vehicle body frame, the distance between the vehicle body frame and the handle changes. Even in such a case, it is possible to freely change the length of the wire electrically connecting the electric component attached to the vehicle body frame and the terminal attached to the handle by using the curl cord of the wire.

In addition, since the curl cord is disposed inside the steering shaft, the steering shaft can suppress entering of electromagnetic waves into the steering shaft from the outside. Accordingly, it is possible to suppress generation of noise by external electromagnetic waves in a signal transmitted to the signal line. Thus, parts for preventing occurrence of signal noise by external electromagnetic waves can be reduced in number or omitted. In this manner, manufacturing costs and the weight of the front two-wheel leaning vehicle can be reduced.

In another aspect, the front two-wheel leaning vehicle preferably has the following configuration. The front two-wheel leaning vehicle further includes: a left suspension part having an upper portion and a lower portion, the lower portion thereof supporting the left front wheel; and a right suspension part having an upper portion and a lower portion, the lower portion thereof supporting the right front wheel. The vehicle body frame includes a linkage support part extending in the top-bottom direction thereof. The linkage mechanism includes a left side member coupled to the upper portion of the left suspension part, such that the upper portion of the left suspension part is rotatable about a left steering axis, the left steering axis extending in the top-bottom direction of the vehicle body frame, a right side member coupled to the upper portion of the right suspension part, such that the upper portion of the right suspension part is rotatable about a right steering axis, the right steering axis being parallel to the left steering axis, and a lower cross member, having a front cross part located, in the front-rear direction of the vehicle body frame, in front of the linkage support part, the left side member, and the right side member, the front cross part having a left end portion, a right end portion and an intermediate portion, and a rear cross part located, in the front-rear direction of the vehicle body frame, behind the linkage support part, the left side member, and the right side member, the rear cross part having a left end portion, a right end portion and an intermediate portion, wherein the left side member is coupled to the left end portion of the front cross part and the left end portion of the rear cross part, such that the left side member is rotatable about a left axis extending in the front-rear direction of the vehicle body frame, the right side member is coupled to the right end portion of the front cross part and the right end portion of the rear cross part, such that the right side member is rotatable about a right axis parallel to the left axis, and the intermediate portions of the front cross part and of the rear cross part are supported by the linkage support part, such that the intermediate portions are rotatable about an intermediate axis parallel to the left axis and the right axis.

This configuration makes it possible to enhance operational feeling of the handle in a speed range from the stationary state to the extremely low speed of the front two-wheel leaning vehicle by adjusting at least one of the handle height or the offset amount with the handle adjusting mechanism described above.

In another aspect, the front two-wheel leaning vehicle preferably has the following configuration. The front two-wheel leaning vehicle further includes a vehicle-state-display section attached to the handle. The vehicle-state-display section is configured to display a vehicle state of the front two-wheel leaning vehicle in color.

This configuration enables the driver to easily know a vehicle state of the front two-wheel leaning vehicle based on a color displayed on the vehicle-state-display section.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of a front two-wheel leaning vehicle according to the present teaching will be herein described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Front Two-wheel Leaning Vehicle]

A front two-wheel leaning vehicle herein is a vehicle that includes a left front wheel and a right front wheel and turns in a leaning posture. Specifically, the front two-wheel leaning vehicle is a vehicle that leans leftward when turning to the left and leans rightward when turning to the right in a left-right direction of the vehicle. The front two-wheel leaning vehicle may be a single-passenger vehicle or a vehicle on which a plurality of passengers can ride. The front two-wheel leaning vehicle includes all the types of vehicles that turn in leaning postures, such as three-wheeled vehicles and four-wheeled vehicles as well as two-wheeled vehicles.

[Vehicle in Stationary State]

A vehicle being in a stationary state herein refers to a state where the speed of the front two-wheel leaning vehicle is zero.

[Extremely Low Speed]

Extremely low speed herein refers to a speed at which the front two-wheel leaning vehicle is caused to turn not by leftward leaning or rightward leaning of the front two-wheel leaning vehicle but by rotation of the handle.

[Handle Height]

A handle height herein refers to a distance of the vehicle body frame in the top-bottom direction to an upper end of a grip of a handle from a midpoint located on a line connecting a rotation center of the left front wheel and a rotation center of the right front wheel and located equidistant from a tread center of the left front wheel and a tread center of the right front wheel in the left-right direction of the vehicle body frame when the vehicle body frame is seen from the front in a state where the front two-wheel leaning vehicle stands upright. That is, the midpoint between the left front wheel and the right front wheel in the left-right direction of the vehicle body frame refers to a point located on the line connecting the rotation center of the left front wheel and the rotation center of the right front wheel and located equidistant from the tread center of the left front wheel and the tread center of the right front wheel in the left-right direction of the vehicle body frame when the vehicle body frame is seen from the front in the state where the front two-wheel leaning vehicle stands upright. A tread of the left front wheel and a tread of the right front wheel respectively refer to portions of the left front wheel and the right front wheel to be in contact with the ground.

[Offset Amount of Handle]

An offset amount of the handle herein refers to an offset amount of the upper end of the grip of the handle with respect to a rotation axis of a steering shaft in the front-rear direction of the vehicle body frame.

Advantageous Effects of Invention

One embodiment of the present teaching provides a front two-wheel leaning vehicle capable of enhancing operational feeling of a handle in a speed range from a stationary state to an extremely low speed of the front two-wheel leaning vehicle.

BRIEF DESCRIPTION OF DRAWINGS

FIG. 12 is a view of a throttle device having another configuration when seen from the right of the vehicle body frame.

FIG. 18 is a view schematically illustrating a state where a position of a handlebar is changed by a handle adjusting mechanism according to another embodiment.

FIG. 19 is a view schematically illustrating a state where a position of a handlebar is changed by a handle adjusting mechanism according to another embodiment.

DESCRIPTION OF EMBODIMENT

Figure 1:
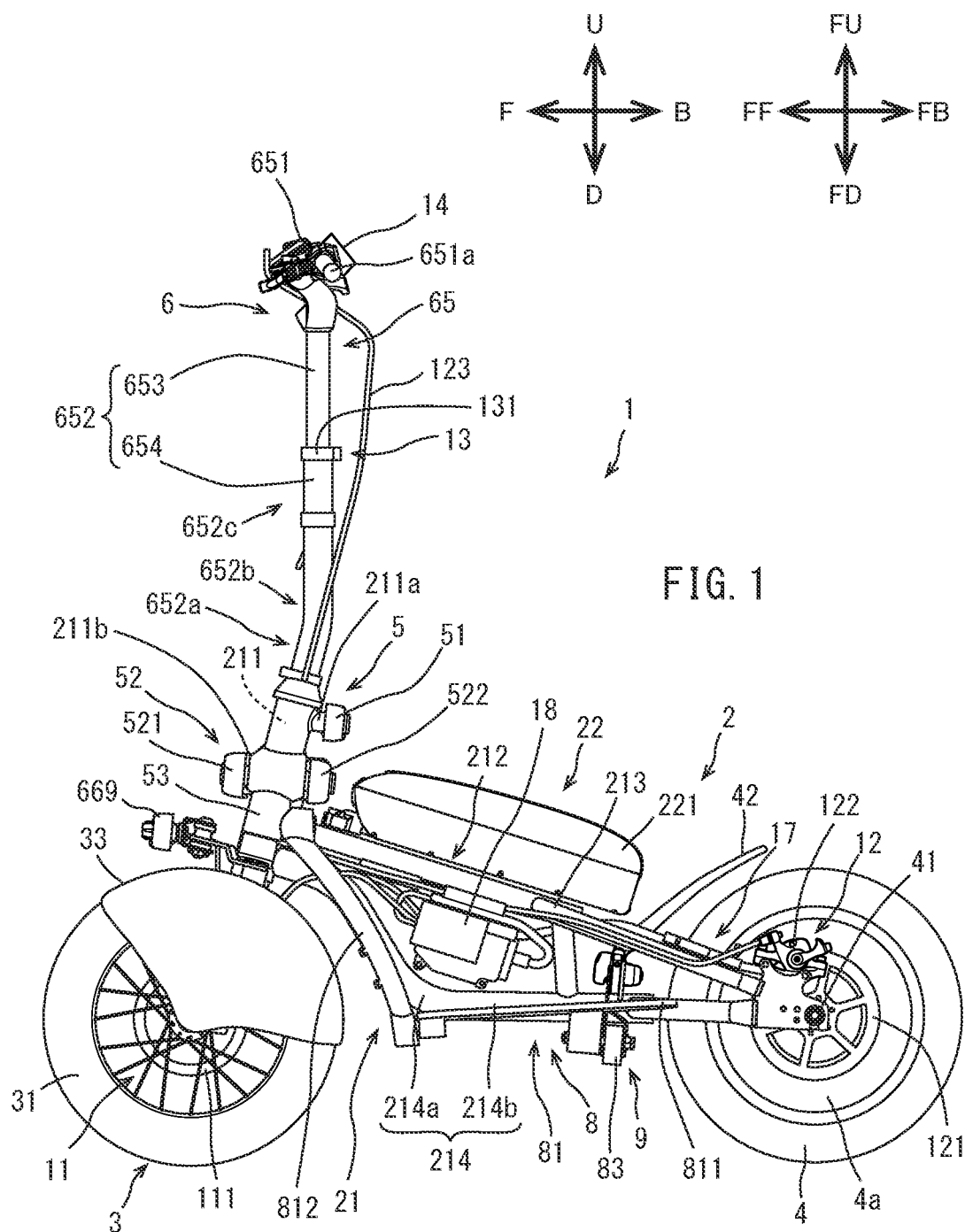
FIG. 1 is a left side view schematically illustrating an overall configuration of a front two-wheel leaning vehicle according to an embodiment.

An embodiment will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

In the following description, arrow F in the drawings represents a forward direction of a front two-wheel leaning vehicle 1. Arrow B in the drawings represents a rearward direction of the front two-wheel leaning vehicle 1. Arrow U in the drawings represents an upward direction of the front two-wheel leaning vehicle 1. Arrow D in the drawings represents a downward direction of the front two-wheel leaning vehicle 1. Arrow R in the drawings represents a rightward direction of the front two-wheel leaning vehicle 1. Arrow L in the drawings represents a leftward direction of the front two-wheel leaning vehicle 1. A front-rear direction, a left-right direction, and a top-bottom direction of the front two-wheel leaning vehicle 1 refer to a front-rear direction, a left-right direction, and a top-bottom direction, respectively, with respect to the front two-wheel leaning vehicle 1 when seen from a driver of the front two-wheel leaning vehicle 1.

The front two-wheel leaning vehicle 1 according to this embodiment turns with a vehicle body frame leaning leftward or rightward with respect to a vertical direction. Thus, in addition to the directions with respect to the vehicle, directions with respect to the vehicle body frame are defined as follows. Arrow FF in the drawings represents a forward direction of the vehicle body frame. Arrow FB in the drawings represents a rearward direction of the vehicle body frame. Arrow FU in the drawings represents an upward direction of the vehicle body frame. Arrow FD in the drawings represents a downward direction of the vehicle body frame. Arrow FR in the drawings represents a rightward direction of the vehicle body frame. Arrow FL in the drawings represents a leftward direction of the vehicle body frame. A front-rear direction, a left-right direction, and a top-bottom direction of the vehicle body frame refer to a front-rear direction, a left-right direction, and a top-bottom direction, respectively, with respect to the vehicle body frame when seen from a driver of the front two-wheel leaning vehicle.

(Overall Configuration)

FIG. 1 is a left side view schematically illustrating an overall configuration of the front two-wheel leaning vehicle 1 according to the embodiment. FIG. 1 is a left side view illustrating a state where a vehicle body cover is detached from the front two-wheel leaning vehicle 1. The leaning vehicle 1 includes a vehicle body 2, a pair of left and right front wheels 3, a rear wheel 4, a linkage mechanism 5, a steering mechanism 6, a load transfer mechanism 8, a restriction mechanism 9, a front-wheel-braking mechanism 11, a rear-wheel-braking mechanism 12, a handle adjusting mechanism 13, a meter 14, a throttle device 15 (see FIG. 2), an interlocking mechanism 16 (see FIG. 9), a lock mechanism 17, and a controller 18. That is, the front two-wheel leaning vehicle 1 in this embodiment is a three-wheeled vehicle including the pair of left and right front wheels 3. The front two-wheel leaning vehicle 1 is a vehicle that leans leftward when turning to the left and leans rightward when turning to the right.

The vehicle body 2 includes a vehicle body frame 21 and a power unit 22. In FIG. 1, the vehicle body frame 21 is in an upright state. In the case of referring to FIG. 1, the following description is based on a premise that the vehicle body frame 21 is in the upright state. The upright state of the vehicle body frame 21 refers to a state where the top-bottom direction of the vehicle body frame 21 coincides with the vertical direction.

The vehicle body frame 21 supports the power unit 22, for example. The vehicle body frame 21 includes a head pipe 211 (linkage support part) and a main frame 212.

The head pipe 211 is located in a front portion of the front two-wheel leaning vehicle 1. When the front two-wheel leaning vehicle 1 is seen from the left, an upper portion of the head pipe 211 is located at the rear of a lower portion of the head pipe 211 in the front-rear direction of the vehicle body frame 21. The linkage mechanism 5 is disposed around the head pipe 211. A steering shaft 652 described later is rotatably inserted in the head pipe 211.

The main frame 212 is connected to the head pipe 211. The main frame 212 is located at the rear of the head pipe 211 in the front-rear direction of the vehicle body frame 21. The main frame 212 supports the power unit 22. A rear end portion of the main frame 212 supports the rear wheel 4 such that the rear wheel 4 is rotatable about a wheel shaft 41.

The main frame 212 includes an upper frame 213 and an under frame 214.

When the vehicle body frame 21 is seen from the left, the upper frame 213 extends rearward in the front-rear direction of the vehicle body frame 21 and downward in the top-bottom direction of the vehicle body frame 21 from the head pipe 211 toward the rear wheel 4. A rear end portion of the upper frame 213 supports the rear wheel 4 together with an under frame rear portion 214b described later. The power unit 22 is supported by the upper frame 213.

The under frame 214 includes an under frame front portion 214a and the under frame rear portion 214b. When the vehicle body frame 21 is seen from the left, the under frame front portion 214a extends from the head pipe 211 rearward in the front-rear direction of the vehicle body frame 21 and downward in the top-bottom direction of the vehicle body frame 21. A front end portion of the under frame front portion 214a is connected to the head pipe 211. The under frame rear portion 214b extends rearward from a rear end portion of the under frame front portion 214a in the front-rear direction of the vehicle body frame 21. A rear end portion of the under frame rear portion 214b supports the rear wheel 4 together with the upper frame 213.

As described above, since the main frame 212 includes the upper frame 213 and the under frame 214, strength and rigidity of the main frame 212 can be increased. In the case of further reducing the height of the main frame in the top-bottom direction of the vehicle body frame, the main frame may include only the under frame.

Figure 2:
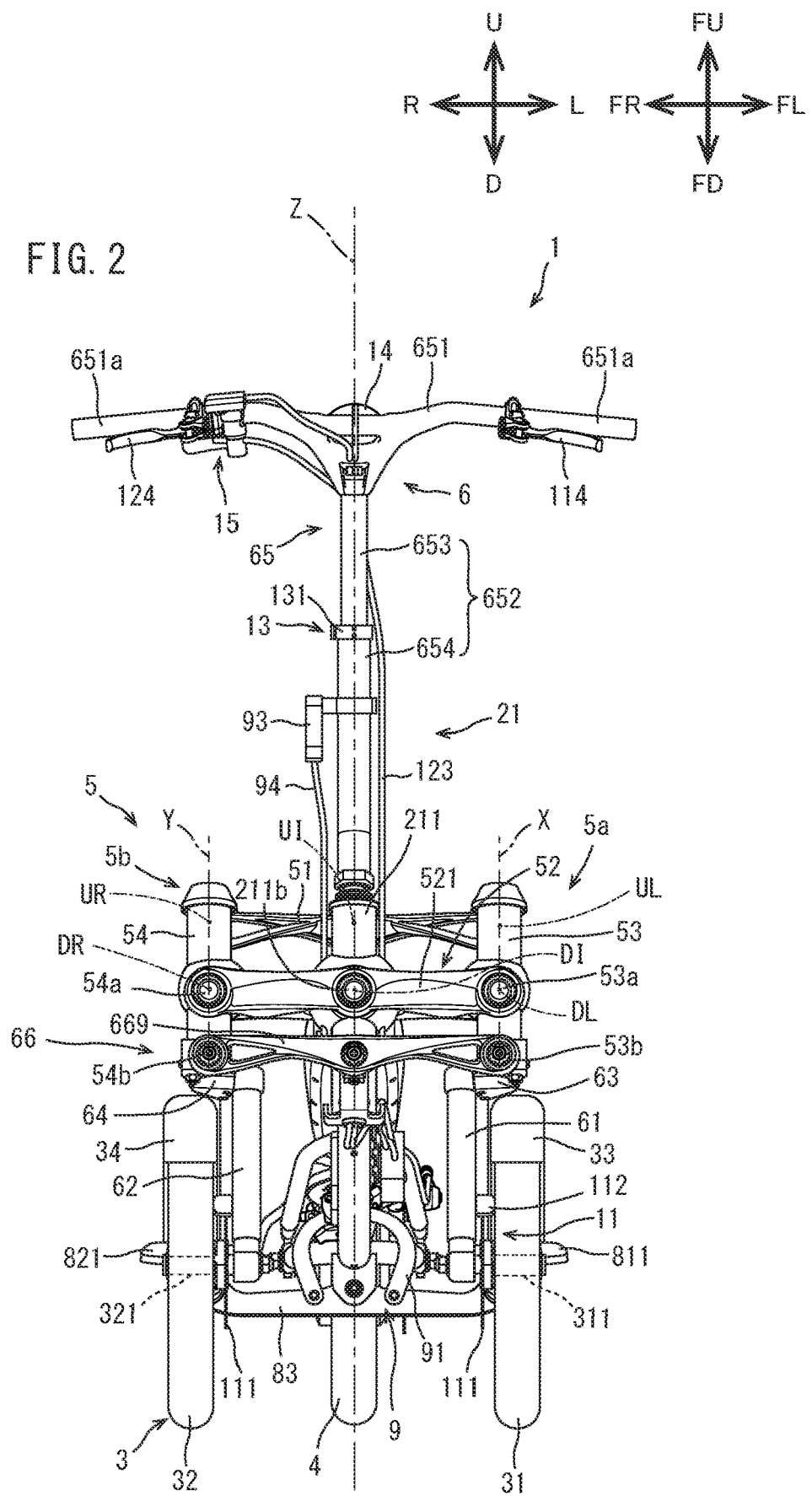
FIG. 2 is a front view illustrating a configuration of a vehicle front portion when the front two-wheel leaning vehicle is seen from the front.

FIG. 2 is a front view of a front portion of the front two-wheel leaning vehicle 1 when seen from the front. FIG. 2 is a front view illustrating a state where the vehicle body cover is detached from the front two-wheel leaning vehicle 1. In FIG. 2, the vehicle body frame 21 is in an upright state. In the case of referring to FIG. 2, the following description is based on a premise that the vehicle body frame 21 is in the upright state.

As illustrated in FIGS. 1 and 2, the pair of left and right front wheels 3 is located below the head pipe 211 and the linkage mechanism 5 in the top-bottom direction of the vehicle body frame 21. As illustrated in FIG. 2, the pair of left and right front wheels 3 is supported by a left suspension part 61 and a right suspension part 62 described later.

A braking force is applied to each of the pair of left and right front wheels 3 by the front-wheel-braking mechanism 11. As illustrated in FIG. 2, the front-wheel-braking mechanism 11 includes front-wheel-brake discs 111, front-wheel-brake calipers 112, front-wheel-brake hoses (not shown), and a front-wheel-brake lever 114.

The front-wheel-brake discs 111 are disc-shaped members and rotate together with the front wheels 3. The front-wheel-brake calipers 112 are individually attached to the left suspension part 61 and the right suspension part 62. The front-wheel-brake calipers 112 are actuated by changing a hydraulic pressure in the front-wheel-brake hoses. The hydraulic pressure in the front-wheel-brake hoses changes in accordance with an operation of the front-wheel-brake lever 114 provided in a handlebar 651. Thus, in accordance with the operation of the front-wheel-brake lever 114, the front-wheel-brake calipers 112 sandwich the front-wheel-brake discs 111 in the thickness direction and apply a friction force to the front-wheel-brake discs 111.

As described above, since the front-wheel-brake calipers 112 provided in the pair of left and right front wheels 3 are driven by the hydraulic pressure, the direction in which the front-wheel-brake hoses extend with respect to the front-wheel-brake calipers 112 can be freely changed. Accordingly, flexibility of layout of the front-wheel-brake calipers 112 can be obtained.

As illustrated in FIG. 1, the rear wheel 4 is located at the rear of the pair of left and right front wheels 3 in the front-rear direction of the vehicle body frame 21. A braking force is applied to the rear wheel 4 by the rear-wheel-braking mechanism 12.

The rear-wheel-braking mechanism 12 includes a rear-wheel-brake disc 121, a rear-wheel-brake caliper 122, a rear-wheel-brake wire 123, and a rear-wheel-brake lever 124 (see FIG. 2).

The rear-wheel-brake disc 121 is a disc-shaped member and rotates together with the rear wheel 4. The rear-wheel-brake caliper 122 is attached to the rear end portion of the main frame 212. The rear-wheel-brake caliper 122 is actuated since an operation of the rear-wheel-brake lever 124 is transferred to the rear-wheel-brake caliper 122 through the rear-wheel-brake wire 123. Thus, in accordance with the operation of the rear-wheel-brake lever 124, the rear-wheelbrake caliper 122 sandwiches the rear-wheel-brake disc 121 in the thickness direction and applies a friction force to the rear-wheel-brake disc 121.

Figure 3:
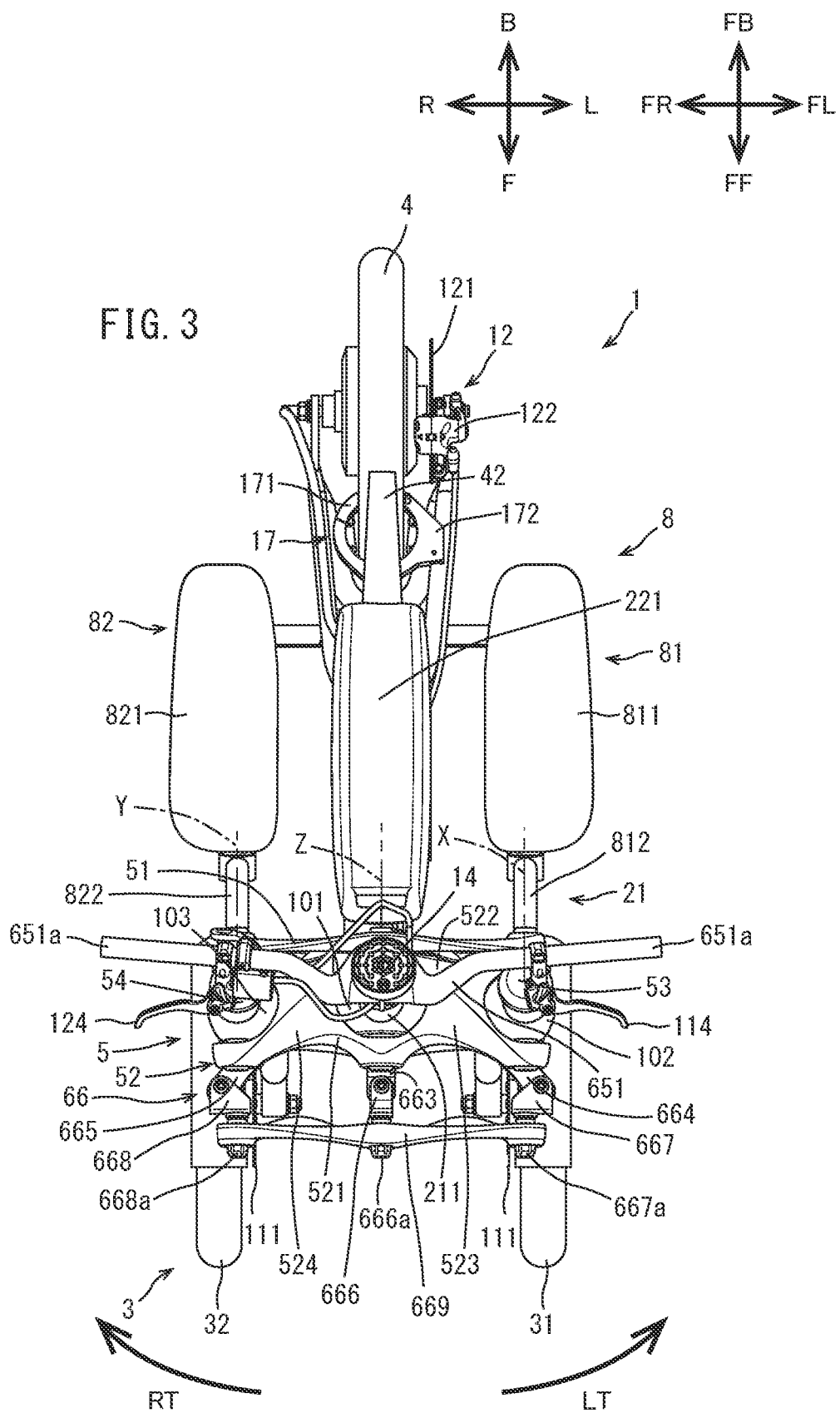
FIG. 3 is a top view when the front two-wheel leaning vehicle is seen from above.

Rotation of the rear wheel 4 is capable of being restricted by the lock mechanism 17. As illustrated in FIG. 3, the lock mechanism 17 includes a ring part 171 through which the rear wheel 4 penetrates in a locked state, and a fixing part 172 to which the ring part 171 is fixed in the locked state while holding the ring part 171 such that the ring part 171 is rotatable in a circumferential direction. That is, the lock mechanism 17 is a so-called ring-type lock mechanism.

In this embodiment, the fixing part 172 restricts movement of the ring part 171 with a solenoid in the locked state. When power is turned on by a power-supply-operation section 142 of the meter 14 described later, the solenoid of the fixing part 172 is driven to thereby unlock the ring part 171. In fixing the ring part 171 by the fixing part 172, the ring part 171 is manually rotated in the circumferential direction to be moved to a fixing position of the fixing part 172.

In the top-bottom direction of the vehicle body frame 21, a rear fender 42 is located above the rear wheel 4. The rear fender 42 is fixed to the main frame 212. The rear fender 42 extends from the main frame 212 rearward in the front-rear direction of the vehicle body frame 21 and upward in the top-bottom direction of the vehicle body frame 21.

The rear fender may be fixed to the wheel shaft 41 by a strut. The rear fender may be fixed to the main frame 212 by a strut. The rear fender may be fixed to both the wheel shaft 41 and the main frame 212. The rear fender may be divided into a front portion and a rear portion in the front-rear direction of the vehicle body frame 21. In this case, the front portion of the rear fender is fixed to, for example, the main frame 212. The rear portion of the rear fender is fixed to, for example, the wheel shaft 41. A taillight may be provided in the rear fender as one unit.

The power unit 22 generates a driving force for causing the front two-wheel leaning vehicle 1 to travel. As illustrated in FIG. 1, the power unit 22 is located at the front of the wheel shaft 41 of the rear wheel 4 in the front-rear direction of the vehicle body frame 21. The power unit 22 is fixed to the vehicle body frame 21. The power unit 22 includes an unillustrated motor and a battery 221. In this embodiment, the motor is disposed in a wheel 4a of the rear wheel 4. Electric power is supplied to the motor from the battery 221 fixed to the upper frame 213 of the vehicle body frame 21.

As illustrated in FIG. 2, the pair of left and right front wheels 3 includes a left front wheel 31 and a right front wheel 32. The left front wheel 31 is located at the left of the head pipe 211 that is a part of the vehicle body frame 21 in the left-right direction of the vehicle body frame 21. The right front wheel 32 is located at the right of the head pipe 211 in the left-right direction of the vehicle body frame 21. That is, the left front wheel 31 and the right front wheel 32 are disposed side by side in the left-right direction of the vehicle body frame 21.

As illustrated in FIG. 2, the left front wheel 31 is connected to the left suspension part 61. Specifically, the left front wheel 31 is connected to a lower portion of the left suspension part 61. The left front wheel 31 is supported by the left suspension part 61 to be rotatable about a left axle 311. The left axle 311 is disposed in the lower portion of the left suspension part 61 and extends in the left-right direction of the vehicle body frame 21.

The right front wheel 32 is connected to the right suspension part 62. Specifically, the right front wheel 32 is connected to a lower portion of the right suspension part 62.

The right front wheel 32 is supported by the right suspension part 62 to be rotatable about a right axle 321. The right axle 321 is disposed in the lower portion of the right suspension part 62 and extends in the left-right direction of the vehicle body frame 21.

In the top-bottom direction of the vehicle body frame 21, a left front fender 33 is located above the left front wheel 31. In the top-bottom direction of the vehicle body frame 21, a right front fender 34 is located above the right front wheel 32. The left front fender 33 is fixed to the left axle 311 of the left front wheel 31. The right front fender 34 is fixed to the right axle 321 of the right front wheel 32.

The left front fender may be fixed to the left suspension part 61 described later. The left front fender may be fixed to the left axle 311 or the left suspension part 61 by a strut. The left front fender may be fixed to a left-foot-placing part 811 or a left coupling member 812 in the load transfer mechanism 8 described later. The left front fender may be divided into a front portion and a rear portion in the front-rear direction of the vehicle body frame 21. In this case, the front portion of the left front fender is fixed to, for example, a left bracket 63 of the steering mechanism 6 described later. The rear portion of the left front fender may be fixed to the left-foot-placing part 811 or the left coupling member 812, or may be fixed to the left axle 311 or the left suspension part 61 by a strut.

The right front fender may be fixed to the right suspension part 62 described later. The right front fender may be fixed to the right axle 321 or the right suspension part 62 by a strut. The right front fender may be fixed to a right-foot-placing part 821 or a right coupling member 822 in the load transfer mechanism 8 described later. The right front fender may be divided into a front portion and a rear portion in the front-rear direction of the vehicle body frame 21. In this case, the front portion of the right front fender is fixed to, for example, a right bracket 64 of the steering mechanism 6 described later. The rear portion of the right front fender may be fixed to the right-foot-placing part 821 or the right coupling member 822, or may be fixed to the right axle 321 or the right suspension part 62 by a strut.

Figure 4:
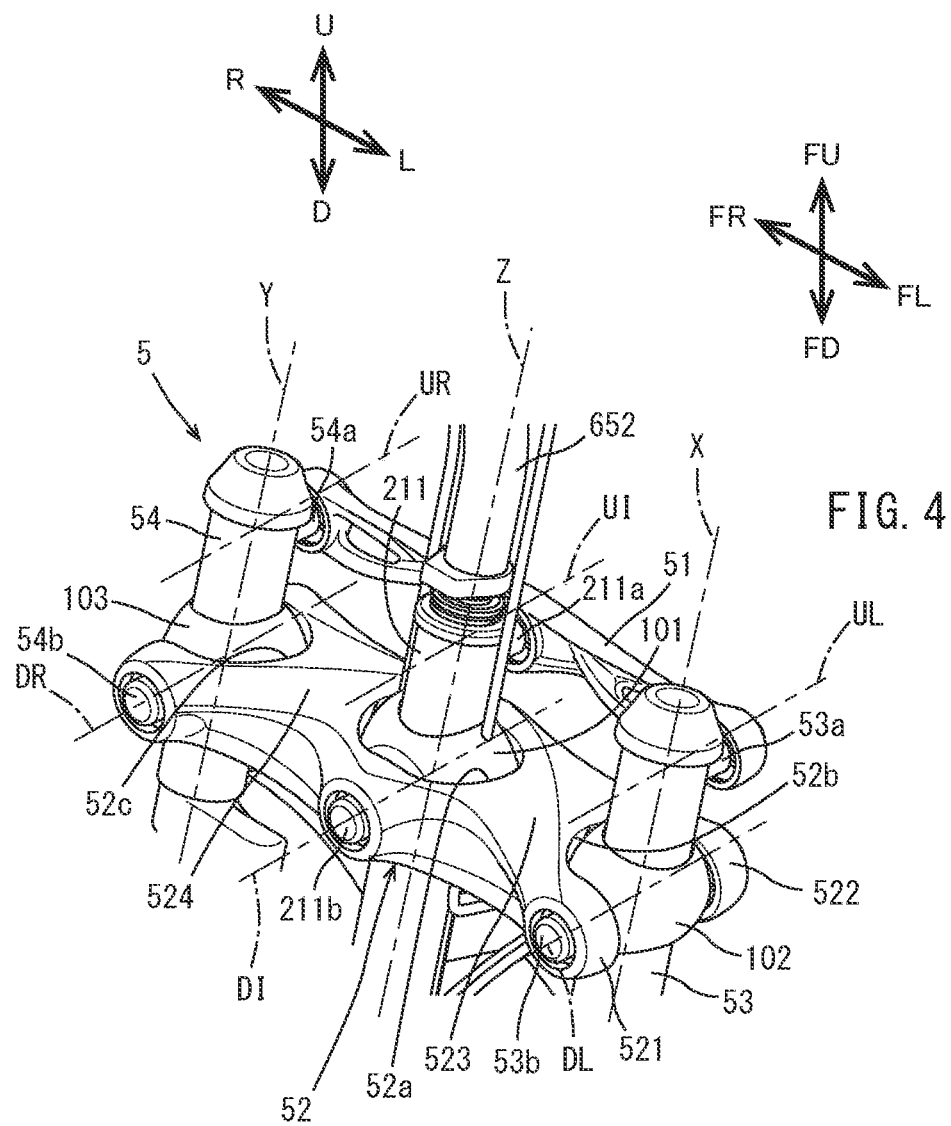
FIG. 4 is a perspective view illustrating a linkage mechanism in an enlarged manner.

FIG. 3 is a top view when the front two-wheel leaning vehicle 1 is seen from above in the top-bottom direction of the vehicle body frame 21. FIG. 4 is a perspective view illustrating the linkage mechanism 5 in an enlarged manner. In FIGS. 3 and 4, the vehicle body frame 21 is in an upright state. In the case of referring to FIGS. 3 and 4, the following description is based on a premise that the vehicle body frame 21 is in the upright state.

The linkage mechanism 5 is a linkage mechanism of a parallel four-bar linkage (also referred to as a parallelogram linkage) type.

As illustrated in FIG. 2, the linkage mechanism 5 is located below the handlebar 651 in the top-bottom direction of the vehicle body frame 21. The linkage mechanism 5 is located above the left front wheel 31 and the right front wheel 32 in the top-bottom direction of the vehicle body frame 21.

The linkage mechanism 5 includes an upper cross member 51, a lower cross member 52, a left side member 53, and a right side member 54. The linkage mechanism 5 is not interlocked with rotation of the steering shaft 652 about an intermediate steering axis Z caused by operation of the handlebar 651. That is, the linkage mechanism 5 does not rotate about the intermediate steering axis Z with respect to the vehicle body frame 21.

As illustrated in FIG. 1, the upper cross member 51 is located at the rear of the head pipe 211 in the front-rear direction of the vehicle body frame 21. As illustrated in FIG. 2, the upper cross member 51 extends in the left-right direction of the vehicle body frame 21.

As illustrated in FIGS. 1 and 2, the lower cross member 52 is located below the upper cross member 51 in the top-bottom direction of the vehicle body frame 21. The lower cross member 52 includes a front-lower-cross part 521 (front cross part), a rear-lower-cross part 522 (rear cross part), and lower-cross-coupling parts 523 and 524 (see FIG. 3).

As illustrated in FIG. 1, the front-lower-cross part 521 is located at the front of the head pipe 211 in the front-rear direction of the vehicle body frame 21. The rear-lower-cross part 522 is located at the rear of the head pipe 211 in the front-rear direction of the vehicle body frame 21. Each of the front-lower-cross part 521 and the rear-lower-cross part 522 extends in the left-right direction of the vehicle body frame 21.

As illustrated in FIGS. 3 and 4, each of the lower-cross-coupling parts 523 and 524 couples the front-lower-cross part 521 and the rear-lower-cross part 522 to each other in the front-rear direction of the vehicle body frame 21. Specifically, the lower-cross-coupling part 523 couples the front-lower-cross part 521 and the rear-lower-cross part 522 to each other at a location between the head pipe 211 and the left side member 53 in the left-right direction of the vehicle body frame 21. The lower-cross-coupling part 524 couples the front-lower-cross part 521 and the rear-lower-cross part 522 to each other at a location between the head pipe 211 and the right side member 54 in the left-right direction of the vehicle body frame 21.

In the lower cross member 52, the front-lower-cross part 521, the rear-lower-cross part 522, and the lower-cross-coupling parts 523 and 524 are integrally formed.

With the configuration described above, as illustrated in FIG. 4, the lower cross member 52 has a through hole 52a in which the head pipe 211 penetrates, between the lower-cross-coupling parts 523 and 524. In the left-right direction of the vehicle body frame 21, the lower cross member 52 has a left notch 52b in which the left side member 53 is located at the left end thereof, and a right notch 52c in which the right side member 54 is located at the right end thereof.

As illustrated in FIGS. 2 and 3, the left side member 53 is located at the left of the head pipe 211 in the left-right direction of the vehicle body frame 21. The left side member 53 is located above the left front wheel 31 in the top-bottom direction of the vehicle body frame 21. The left side member 53 extends in the direction in which the head pipe 211 extends. The left side member 53 extends in the direction in which the intermediate steering axis Z of the steering shaft 652 extends. An upper portion of the left side member 53 is located at the rear of a lower portion of the left side member 53 in the front-rear direction of the vehicle body frame 21.

The right side member 54 is located at the right of the head pipe 211 in the left-right direction of the vehicle body frame 21. The right side member 54 is located above the right front wheel 32 in the top-bottom direction of the vehicle body frame 21. The right side member 54 extends in the direction in which the head pipe 211 extends. The right side member 54 extends in the direction in which the intermediate steering axis Z of the steering shaft 652 extends. An upper portion of the right side member 54 is located at the rear of a lower portion of the right side member 54 in the front-rear direction of the vehicle body frame 21.

As illustrated in FIG. 4, the head pipe 211 includes an upper-intermediate-coupling part 211a and a lower-intermediate-coupling part 211b.

An intermediate portion of the upper cross member 51 is rotatably coupled to the head pipe 211 through the upper-intermediate-coupling part 211a. That is, the upper cross member 51 is rotatable with respect to the head pipe 211 about an upper-intermediate-coupling axis UI passing through the upper-intermediate-coupling part 211a and extending in the front-rear direction of the vehicle body frame 21.

An intermediate portion of the lower cross member 52 is rotatably coupled to the head pipe 211 through the lower-intermediate-coupling part 211b. That is, the lower cross member 52 is rotatable with respect to the head pipe 211 about a lower-intermediate-coupling axis DI (intermediate axis) passing through the lower-intermediate-coupling part 211b and extending in the front-rear direction of the vehicle body frame 21.

The left side member 53 includes an upper-left-coupling part 53a and a lower-left-coupling part 53b.

A left end portion of the upper cross member 51 is rotatably coupled to the left side member 53 through the upper-left-coupling part 53a. That is, the upper cross member 51 is rotatable with respect to the left side member 53 about an upper-left-coupling axis UL passing through the upper-left-coupling part 53a and extending in the front-rear direction of the vehicle body frame 21.

A left end portion of the lower cross member 52 is rotatably coupled to the left side member 53 through the lower-left-coupling part 53b. That is, the lower cross member 52 is rotatable with respect to the left side member 53 about a lower-left-coupling axis DL (left axis) passing through the lower-left-coupling part 53b and extending in the front-rear direction of the vehicle body frame 21.

The right side member 54 includes an upper-right-coupling part 54a and a lower-right-coupling part 54b.

A right end portion of the upper cross member 51 is rotatably coupled to the right side member 54 through the upper-right-coupling part 54a. That is, the upper cross member 51 is rotatable with respect to the right side member 54 about an upper-right-coupling axis UR passing through the upper-right-coupling part 54a and extending in the front-rear direction of the vehicle body frame 21.

A right end portion of the lower cross member 52 is rotatably coupled to the right side member 54 through the lower-right-coupling part 54b. That is, the lower cross member 52 is rotatable with respect to the right side member 54 about a lower-right-coupling axis DR (right axis) passing through the lower-right-coupling part 54b and extending in the front-rear direction of the vehicle body frame 21.

The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL extend mutually in parallel. The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL are located above the left front wheel 31 and the right front wheel 32 in the top-bottom direction of the vehicle body frame 21.

As described above, the upper cross member 51, the lower cross member 52, the left side member 53, and the right side member 54 are supported by the vehicle body frame 21 such that the upper cross member 51 and the lower cross member 52 are kept in parallel with each other, and the left side member 53 and the right side member 54 are kept in parallel with each other.

As illustrated in FIG. 2, the steering mechanism 6 includes the left suspension part 61, the right suspension part 62, the left bracket 63, the right bracket 64, a steering member 65, and a steering-force-transfer mechanism 66.

The left suspension part 61 supports the left front wheel 31 with respect to the linkage mechanism 5. The left suspension part 61 extends in the direction in which the intermediate steering axis Z extends. A lower end portion of the left suspension part 61 supports the left front wheel 31. An upper end portion of the left suspension part 61 is fixed to the left bracket 63.

The left bracket 63 includes an unillustrated left rotating member in an upper portion thereof. The left rotating member is located inside the left side member 53 of the linkage mechanism 5 and extends in the direction in which the left side member 53 extends. The left rotating member is rotatable about a left steering axis X with respect to the left side member 53. That is, the left bracket 63 is rotatable about the left steering axis X with respect to the left side member 53. The left steering axis X extends in the direction in which the left side member 53 extends.

As illustrated in FIG. 2, the left steering axis X extends in the top-bottom direction of the vehicle body frame 21, in parallel with the intermediate steering axis Z of the steering shaft 652.

The right bracket 64 includes an unillustrated right rotating member in an upper portion thereof. The right rotating member is located inside the right side member 54 of the linkage mechanism 5 and extends in the direction in which the right side member 54 extends. The right rotating member is rotatable about a right steering axis Y with respect to the right side member 54. That is, the right bracket 64 is rotatable about the right steering axis Y with respect to the right side member 54. The right steering axis Y extends in the direction in which the right side member 54 extends.

The right suspension part 62 supports the right front wheel 32 with respect to the linkage mechanism 5. The right suspension part 62 extends in the direction in which the intermediate steering axis Z extends. A lower end portion of the right suspension part 62 supports the right front wheel 32. An upper end portion of the right suspension part 62 is fixed to the right bracket 64.

As illustrated in FIG. 2, the right steering axis Y extends in the top-bottom direction of the vehicle body frame 21, in parallel with the intermediate steering axis Z of the steering shaft 652.

The linkage mechanism 5 of the front two-wheel leaning vehicle 1 having the configuration described above includes a first spacer 101, a second spacer 102, and a third spacer 103.

As illustrated in FIG. 4, in the linkage mechanism 5, the first spacer 101, the second spacer 102, and the third spacer 103 are disposed in portions where the head pipe 211, the left side member 53, and the right side member 54, respectively, intersect with the lower cross member 52.

As illustrated in FIG. 4, the first spacer 101 is located in the through hole 52a of the lower cross member 52 and attached to the head pipe 211 such that the first spacer 101 is located in a gap between the lower cross member 52 and the head pipe 211. That is, the first spacer 101 is located in a gap between the lower-cross-coupling part 523 of the lower cross member 52 and the head pipe 211 and in a gap between the lower-cross-coupling part 524 of the lower cross member 52 and the head pipe 211. The first spacer 101 is a spherical resin member. The head pipe 211 penetrates the first spacer 101 in the radial direction.

The first spacer 101 described above can prevent entering of foreign matter into gaps between the head pipe 211 and the lower-cross-coupling parts 523 and 524.

As illustrated in FIG. 4, the second spacer 102 is located in the left notch 52b of the lower cross member 52 and attached to the left side member 53 such that the second spacer 102 is located in a gap between the lower-cross-coupling part 523 of the lower cross member 52 and the left side member 53. The second spacer 102 is a spherical resin member. The left side member 53 penetrates the second spacer 102 in the radial direction.

The second spacer 102 described above can prevent entering of foreign matter into a gap between the left side member 53 and the lower-cross-coupling part 523.

As illustrated in FIG. 4, the third spacer 103 is located in the right notch 52c of the lower cross member 52 and attached to the right side member 54 such that the third spacer 103 is located in a gap between the lower-cross-coupling part 524 of the lower cross member 52 and the right side member 54. The third spacer 103 is a spherical resin member. The right side member 54 penetrates the third spacer 103 in the radial direction.

The third spacer 103 described above can prevent entering of foreign matter into a gap between the right side member 54 and the lower-cross-coupling part 524.

The steering member 65 includes the handlebar 651 and the steering shaft 652.

The handlebar 651 is a rod-shaped member extending in the left-right direction of the vehicle body frame 21. In the left-right direction of the vehicle body frame 21, a center portion of the handlebar 651 is connected to an upper portion of the steering shaft 652. The handlebar 651 has a grip 651a to be held by the driver at each of a left end portion and a right end portion in the left-right direction of the vehicle body frame 21. The handlebar 651 serves as a handle of the front two-wheel leaning vehicle 1.

A part of the steering shaft 652 is rotatably supported by the head pipe 211. As illustrated in FIG. 1, the upper portion of the steering shaft 652 is located at the rear of a lower portion of the steering shaft 652 in the front-rear direction of the vehicle body frame 21. Accordingly, the direction in which the intermediate steering axis Z of the steering shaft 652 extends tilts in the front-rear direction of the vehicle body frame 21 with respect to the top-bottom direction of the front two-wheel leaning vehicle 1. The steering shaft 652 rotates about the intermediate steering axis Z in accordance with an operation of the handlebar 651 by a driver.

A specific configuration of the steering shaft 652 will be described later.

Next, with reference to FIGS. 2 and 3, the steering-force-transfer mechanism 66 of the steering mechanism 6 will be described.

The steering-force-transfer mechanism 66 transfers a steering force when a driver operates the handlebar 651, to the left bracket 63 and the right bracket 64. As illustrated in FIG. 3, the steering-force-transfer mechanism 66 includes an intermediate transfer plate 663, a left transfer plate 664, a right transfer plate 665, an intermediate joint 666, a left joint 667, a right joint 668, and a tie rod 669.

The intermediate transfer plate 663 is connected to a lower portion of the steering shaft 652. The intermediate transfer plate 663 is non-rotatable with respect to the steering shaft 652. Thus, the intermediate transfer plate 663 is rotatable about the intermediate steering axis Z of the steering shaft 652 together with the steering shaft 652, with respect to the head pipe 211.

The left transfer plate 664 is located at the left of the intermediate transfer plate 663 in the left-right direction of the vehicle body frame 21. The left transfer plate 664 is connected to a lower portion of the left bracket 63. The left transfer plate 664 is non-rotatable with respect to the left bracket 63. Accordingly, the left transfer plate 664 is rotatable about the left steering axis X with respect to the left side member 53.

The right transfer plate 665 is located at the right of the intermediate transfer plate 663 in the left-right direction of the vehicle body frame 21. The right transfer plate 665 is connected to a lower portion of the right bracket 64. The right transfer plate 665 is non-rotatable with respect to the right bracket 64. Accordingly, the right transfer plate 665 is rotatable about the right steering axis Y with respect to the right side member 54.

As illustrated in FIG. 3, the intermediate joint 666 is coupled to a front portion of the intermediate transfer plate 663 through an intermediate joint steering shaft part extending in the top-bottom direction of the vehicle body frame 21. The intermediate transfer plate 663 and the intermediate joint 666 are rotatable relative to each other about the intermediate joint steering shaft part.

The left joint 667 is located at the left of the intermediate joint 666 in the left-right direction of the vehicle body frame 21. The left joint 667 is coupled to a front portion of the left transfer plate 664 through a left-joint-steering-shaft part extending in the top-bottom direction of the vehicle body frame 21. The left transfer plate 664 and the left joint 667 are rotatable relative to each other about the left-joint-steering-shaft part.

The right joint 668 is located at the right of the intermediate joint 666 in the left-right direction of the vehicle body frame 21. The right joint 668 is coupled to a front portion of the right transfer plate 665 through a right-joint-steering-shaft part extending in the top-bottom direction of the vehicle body frame. The right transfer plate 665 and the right joint 668 are rotatable relative to each other about the right-joint-steering-shaft part.

A front portion of the intermediate joint 666 is provided with an intermediate-joint-rotation-shaft part 666a extending in the front-rear direction of the vehicle body frame 21. A front portion of the left joint 667 is provided with a left-joint-rotation-shaft part 667a extending in the front-rear direction of the vehicle body frame 21. A front portion of the right joint 668 is provided with a right-joint-rotation-shaft part 668a extending in the front-rear direction of the vehicle body frame 21.

The tie rod 669 extends in the left-right direction of the vehicle body frame 21. The tie rod 669 is coupled to the intermediate joint 666, the left joint 667, and the right joint 668 through the intermediate-joint-rotation-shaft part 666a, the left-joint-rotation-shaft part 667a, and the right-joint-rotation-shaft part 668a.

In this embodiment, the tie rod 669 is made of the same material as that of the upper cross member 51, and has the same shape as that of the upper cross member 51. The shape of the tie rod may not be the same as that of the upper cross member. The tie rod may be made of a material different from that of the upper cross member. That is, the tie rod may be made of any material as long as necessary strength is obtainable, and the tie rod may also be in any shape as long as necessary strength is obtainable.

The tie rod 669 and the intermediate joint 666 are rotatable relative to each other about the intermediate-joint-rotation-shaft part 666a provided in the front portion of the intermediate joint 666. The tie rod 669 and the left joint 667 are rotatable relative to each other about the left-joint-rotation-shaft part 667a provided in the front portion of the left joint 667. The tie rod 669 and the right joint 668 are rotatable relative to each other about the right-joint-rotation-shaft part 668a provided in the front portion of the right joint 668.

The left transfer plate 664 is coupled to the intermediate transfer plate 663 through the left joint 667, the tie rod 669, and the intermediate joint 666. The right transfer plate 665 is coupled to the intermediate transfer plate 663 through the right joint 668, the tie rod 669, and the intermediate joint 666. The left transfer plate 664 and the right transfer plate 665 are coupled to each other through the left joint 667, the tie rod 669, and the right joint 668. That is, the tie rod 669 couples the intermediate transfer plate 663, the left transfer plate 664, and the right transfer plate 665.

Next, with reference to FIG. 3, a steering operation of the front two-wheel leaning vehicle 1 will be described.

When a driver operates the handlebar 651, the steering shaft 652 (see, for example, FIG. 2) rotates about the intermediate steering axis Z with respect to the head pipe 211. In the case of leftward steering, the steering shaft 652 rotates in the direction indicated by arrow LT. With the rotation of the steering shaft 652, the intermediate transfer plate 663 rotates about the intermediate steering axis Z in the direction indicated by arrow LT with respect to the head pipe 211.

With the rotation of the intermediate transfer plate 663 in the direction indicated by arrow LT, the intermediate joint 666 rotates in the direction indicated by arrow RT with respect to the intermediate transfer plate 663. Accordingly, the tie rod 669 moves rightward in the left-right direction of the vehicle body frame 21 and rearward in the front-rear direction of the vehicle body frame 21 while maintaining the posture thereof.

With the movement of the tie rod 669 described above, the left joint 667 and the right joint 668 rotate in the direction indicated by arrow RT with respect to the left transfer plate 664 and the right transfer plate 665, respectively. Accordingly, while the tie rod 669 maintains the posture thereof, the left transfer plate 664 and the right transfer plate 665 rotate in the direction indicated by arrow LT.

When the left transfer plate 664 rotates in the direction indicated by arrow LT, the left bracket 63, which is non-rotatable with respect to the left transfer plate 664, rotates about the left steering axis X in the direction indicated by arrow LT with respect to the left side member 53.

When the right transfer plate 665 rotates in the direction indicated by arrow LT, the right bracket 64, which is non-rotatable with respect to the right transfer plate 665, rotates about the right steering axis Y in the direction indicated by arrow LT with respect to the right side member 54.

When the left bracket 63 rotates in the direction indicated by arrow LT, the left suspension part 61 supported by the left bracket 63 rotates about the left steering axis X in the direction indicated by arrow LT with respect to the left side member 53. When the left suspension part 61 rotates in the direction indicated by arrow LT, the left front wheel 31 supported by the left suspension part 61 rotates about the left steering axis X in the direction indicated by arrow LT with respect to the left side member 53.

When the right bracket 64 rotates in the direction indicated by arrow LT, the right suspension part 62 supported by the right bracket 64 rotates about the right steering axis Y in the direction indicated by arrow LT with respect to the right side member 54. When the right suspension part 62 rotates in the direction indicated by arrow LT, the right front wheel 32 supported by the right suspension part 62 rotates about the right steering axis Y in the direction indicated by arrow LT with respect to the right side member 54.

When the driver operates the handlebar 651 for rightward steering, the components of the steering mechanism 6 described above rotate in a direction opposite to the direction in leftward steering. That is, with respect of movements of the components of the steering mechanism 6, left movement and right movement are switched between leftward steering and rightward steering. Thus, detailed description on movement of the steering mechanism 6 in rightward steering will be omitted.

Specifically, the steering-force-transfer mechanism 66 causes the left suspension part 61 to rotate about the left steering axis X in a rotation direction of the steering member 65 in accordance with rotation of the steering member 65. Similarly, the steering-force-transfer mechanism 66 causes the right suspension part 62 to rotate about the right steering axis Y in the rotation direction of the steering member 65 in accordance with rotation of the steering member 65. Accordingly, the steering-force-transfer mechanism 66 transfers a steering force to the left front wheel 31 and the right front wheel 32 in accordance with an operation of the steering member 65 by a driver. The left front wheel 31 and the right front wheel 32 rotate about the left steering axis X and the right steering axis Y, respectively, in a direction in accordance with the direction of operation of the steering member 65 by the driver.

Figure 6:
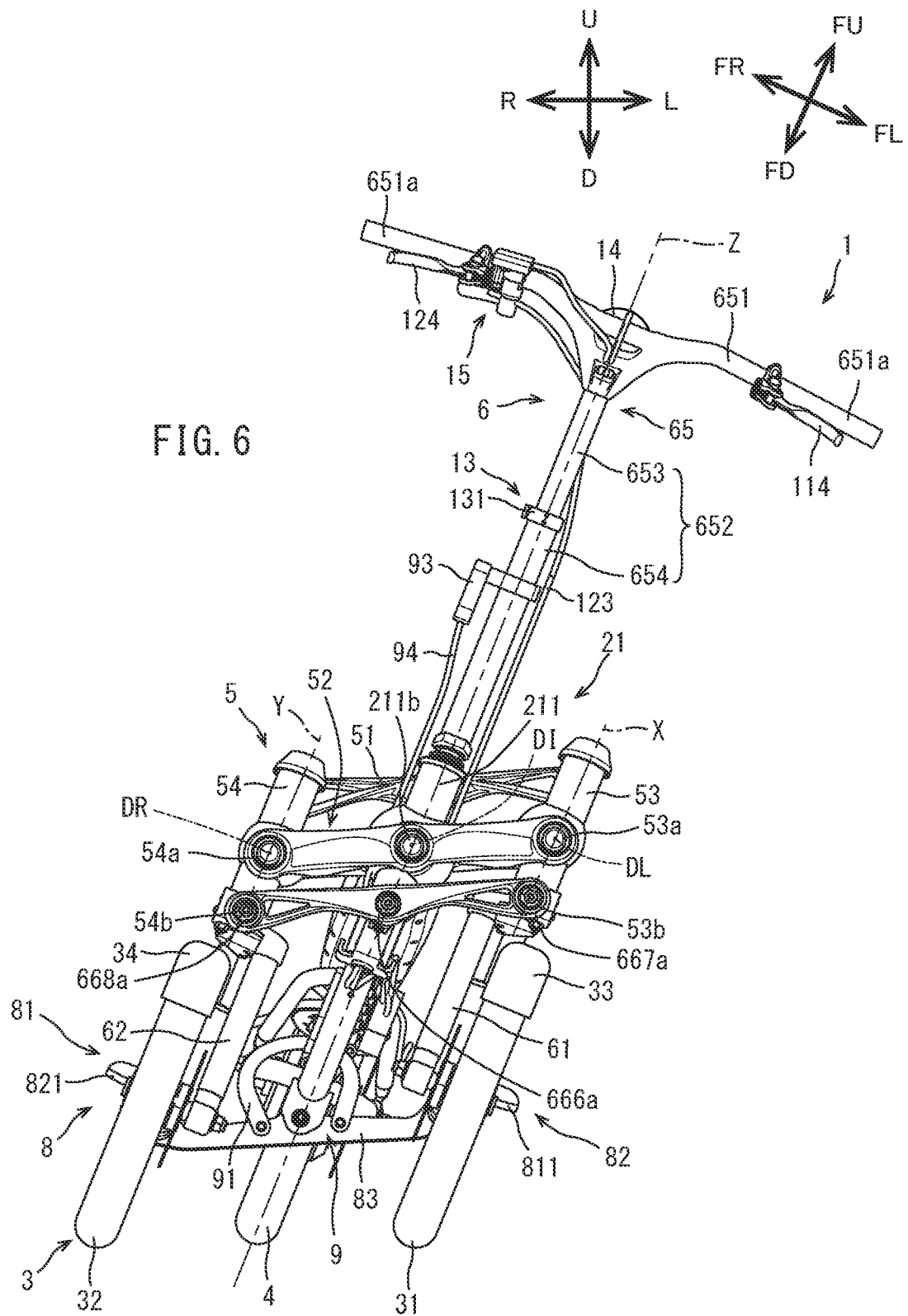
FIG. 6 is a view corresponding to FIG. 2 and illustrating a state where the front two-wheel leaning vehicle leans leftward.

A lean operation of the front two-wheel leaning vehicle 1 will now be described with reference to FIGS. 2 and 6. FIG. 6 is a front view of a front portion of the front two-wheel leaning vehicle 1 in a state where the vehicle body frame 21 leans leftward when seen from the front of the vehicle body frame 21.

As illustrated in FIG. 2, when the front two-wheel leaning vehicle 1 is seen from the front of the vehicle body frame 21 in an upright state, the linkage mechanism 5 has a rectangular shape. As illustrated in FIG. 6, when the front two-wheel leaning vehicle 1 is seen from the front of the vehicle body frame 21 in a lean state, the linkage mechanism 5 has a parallelogram shape. Operation of the linkage mechanism 5 and leftward or rightward leaning of the vehicle body frame 21 are interlocked to each other.

The "operation of the linkage mechanism 5" means that the shape of the linkage mechanism 5 changes. When the linkage mechanism 5 is seen from the front of the vehicle body frame 21, the change of shape of the linkage mechanism 5 is generated by rotation of the upper cross member 51 and the lower cross member 52 about the upper-intermediate-coupling axis UI and the lower-intermediate-coupling axis DI, respectively, with respect to the head pipe 211, and by rotation of the upper cross member 51, the lower cross member 52, the left side member 53, and the right side member 54 about the upper-left-coupling axis UL, the upper-right-coupling axis UR, the lower-left-coupling axis DL, and the lower-right-coupling axis DR, respectively.

For example, as illustrated in FIG. 6, when a driver causes the front two-wheel leaning vehicle 1 to lean leftward, the head pipe 211 leans leftward with respect to the vertical direction. When the head pipe 211 leans leftward, the upper cross member 51 rotates counterclockwise about the upper-intermediate-coupling axis UI with respect to the head pipe 211 when seen from the front of the vehicle body frame 21. Similarly, when the head pipe 211 leans leftward, the lower cross member 52 rotates counterclockwise about the lower-intermediate-coupling axis DI with respect to the head pipe 211 when seen from the front of the vehicle body frame 21. Accordingly, the upper cross member 51 moves to the left in the left-right direction of the vehicle body frame 21 with respect to the lower cross member 52.

With this movement, the upper cross member 51 rotates counterclockwise about the upper-left-coupling axis UL and the upper-right-coupling axis UR with respect to the left side member 53 and the right side member 54, respectively, when seen from the front of the vehicle body frame 21. Similarly, the lower cross member 52 rotates counterclockwise about the lower-left-coupling axis DL and the lower-right-coupling axis DR with respect to the left side member 53 and the right side member 54, respectively, when seen from the front of the vehicle body frame 21. Accordingly, the left side member 53 and the right side member 54 lean to the left of the front two-wheel leaning vehicle 1 with respect to the vertical direction, while maintaining a posture parallel to the head pipe 211.

At this time, the lower cross member 52 moves to the left in the left-right direction of the vehicle body frame 21 with respect to the tie rod 669. With this movement, the tie rod 669 rotates about the intermediate-joint-rotation-shaft part 666a, the left-joint-rotation-shaft part 667a, and the right-joint-rotation-shaft part 668a with respect to the intermediate joint 666, the left joint 667, and the right joint 668, respectively. Accordingly, the tie rod 669 maintains a posture in parallel with the upper cross member 51 and the lower cross member 52.

In the left-right direction of the front two-wheel leaning vehicle 1, leftward leaning of the left side member 53 causes the left suspension part 61 supported by the left side member 53 to lean leftward. This leaning causes the left front wheel 31 supported by the left suspension part 61 to lean leftward while maintaining a posture parallel to the head pipe 211.

In the left-right direction of the front two-wheel leaning vehicle 1, leftward leaning of the right side member 54 causes the right suspension part 62 supported by the right side member 54 to lean leftward. With this leaning, the right front wheel 32 supported by the right suspension part 62 leans leftward while maintaining a posture parallel to the head pipe 211.

In the description on lean operation of the left front wheel 31 and the right front wheel 32 described above, the top-bottom direction is defined with reference to the vertical direction. However, in lean operation of the front two-wheel leaning vehicle 1 (in operation of the linkage mechanism 5), the top-bottom direction of the vehicle body frame 21 does not coincide with the vertical direction. When the top-bottom direction of the vehicle body frame 21 is used as a reference, in operation of the linkage mechanism 5, relative positions of the left front wheel 31 and the right front wheel 32 change in the top-bottom direction of the vehicle body frame 21. In other words, the linkage mechanism 5 causes the vehicle body frame 21 to lean to the left or the right of the front two-wheel leaning vehicle 1 with respect to the vertical direction by changing relative positions of the left front wheel 31 and the right front wheel 32 in the top-bottom direction of the vehicle body frame 21. Accordingly, the front two-wheel leaning vehicle 1 turns to the left.

When the driver causes the front two-wheel leaning vehicle 1 to lean rightward, the components of the front two-wheel leaning vehicle 1 described above lean rightward.

Accordingly, the front two-wheel leaning vehicle 1 turns to the right. With respect to movements of the components of the front two-wheel leaning vehicle 1, left movement and right movement are switched between leftward leaning and rightward leaning. Thus, detailed description on movement of the components of the front two-wheel leaning vehicle 1 in rightward leaning will be omitted.

Figure 5:
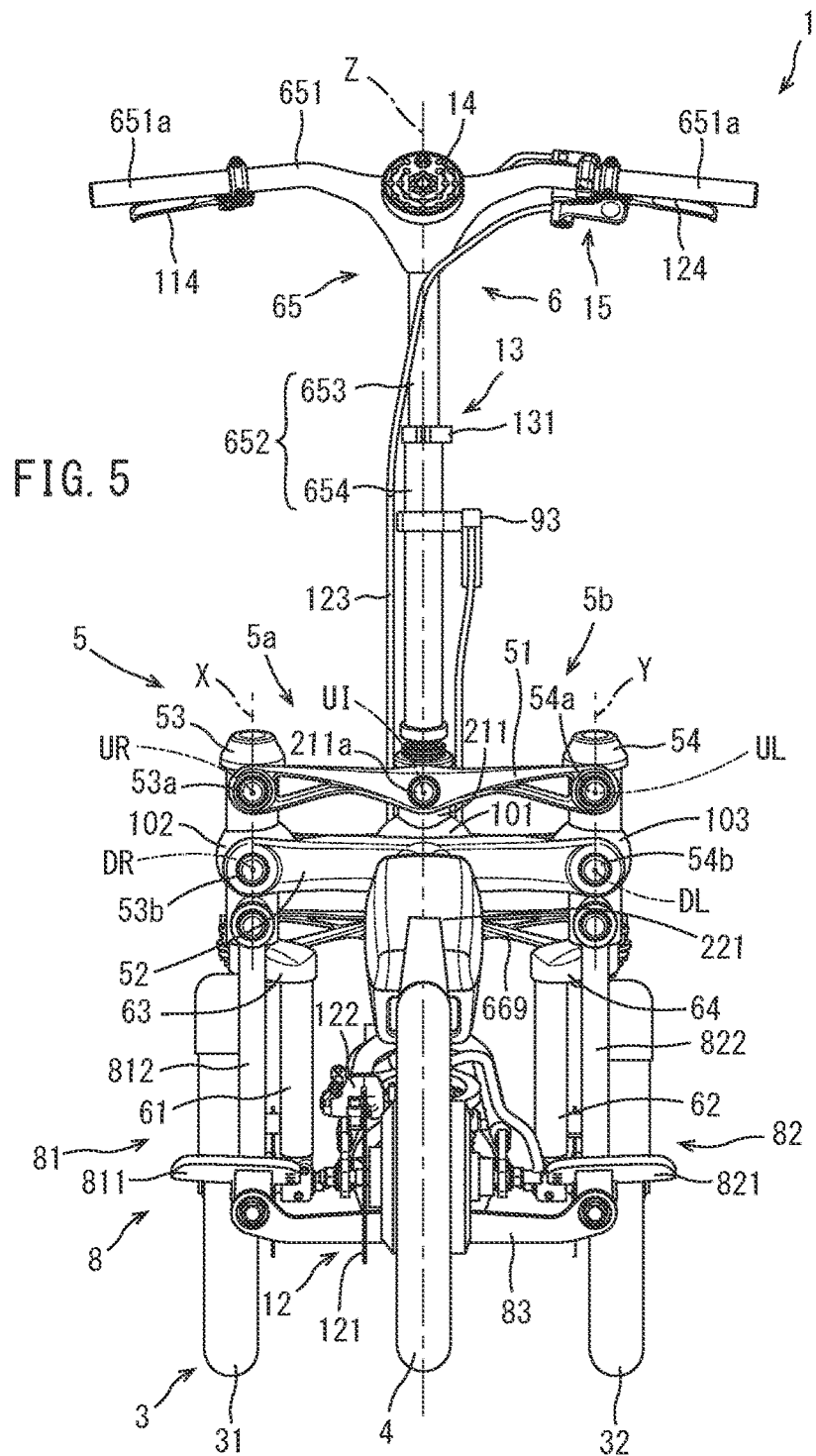
FIG. 5 is a rear view when the front two-wheel leaning vehicle is seen from the rear.

As illustrated in FIGS. 3 and 5, the load transfer mechanism 8 includes a left-foot-load-transfer part 81, a right-foot-load-transfer part 82, and a left-right coupling member 83.

The left-foot-load-transfer part 81 includes the left-foot-placing part 811 and the left coupling member 812.

A left foot of a standing driver is placed on the left-foot-placing part 811. The left coupling member 812 couples the left-foot-placing part 811 and the left side member 53 of the linkage mechanism 5 to each other. That is, the left coupling member 812 is coupled to a left portion 5a including the left side member 53 and located at the left of the head pipe 211 in the left-right direction of the vehicle body frame 21 in the linkage mechanism 5. As illustrated in FIG. 1, the left coupling member 812 extends from the left side member 53 rearward in the front-rear direction of the vehicle body frame 21 and downward in the top-bottom direction of the vehicle body frame 21. A rear end portion of the left coupling member 812 is coupled to the left-foot-placing part 811. The left-foot-load-transfer part 81 is configured to transfer a load of the driver input through the left-foot-placing part 811, to the left portion 5a of the linkage mechanism 5 including the left side member 53.

As illustrated in FIGS. 3 and 5, the right-foot-load-transfer part 82 includes the right-foot-placing part 821 and the right coupling member 822.

A right foot of the standing driver is placed on the right-foot-placing part 821. The right coupling member 822 couples the right-foot-placing part 821 and the right side member 54 of the linkage mechanism 5 to each other. That is, the right coupling member 822 is coupled to a right portion 5b including the right side member 54 and located at the right of the head pipe 211 in the left-right direction of the vehicle body frame 21 in the linkage mechanism 5. The right coupling member 822 extends from the right side member 54 rearward in the front-rear direction of the vehicle body frame 21 and downward in the top-bottom direction of the vehicle body frame 21. A rear end portion of the right coupling member 822 is connected to the right-foot-placing part 821. The right-foot-load-transfer part 82 is configured to transfer a load of the driver input through the right-foot-placing part 821, to the right portion 5b of the linkage mechanism 5 including the right side member 54.

With the configuration described above, a load applied to the left-foot-placing part 811 through the left foot of the driver and a load applied to the right-foot-placing part 821 through the right foot of the driver are individually adjusted to thereby control leaning of the vehicle body frame 21.

Figure 7:
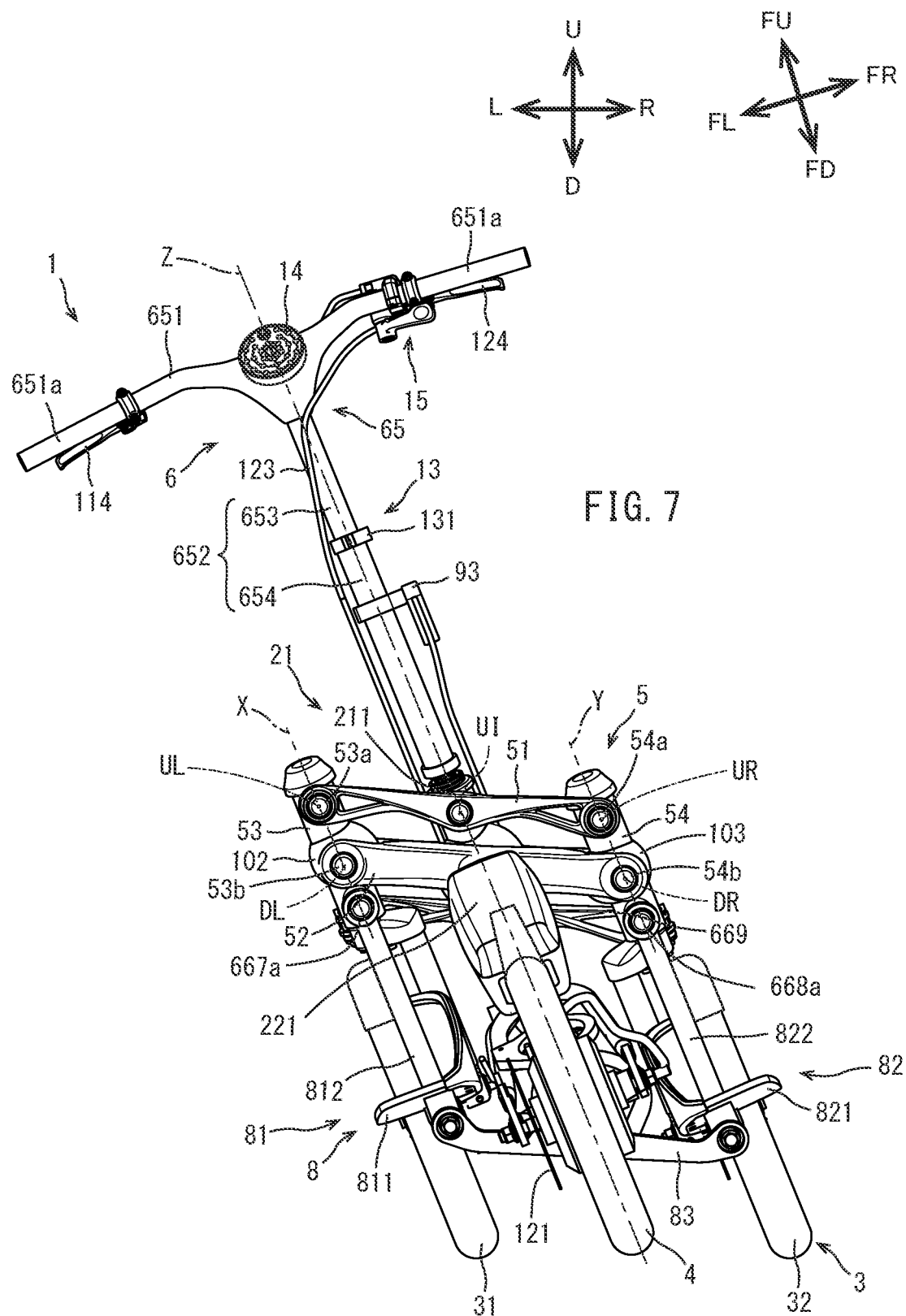
FIG. 7 is a view corresponding to FIG. 5 and illustrating the state where the front two-wheel leaning vehicle leans leftward.

For example, as illustrated in FIGS. 6 and 7, when the vehicle body frame 21 leans to the left of the front two-wheel leaning vehicle 1, the left side member 53 is located above the right side member 54 in the top-bottom direction of the vehicle body frame 21. FIG. 7 is a rear view of a front portion of the front two-wheel leaning vehicle 1 in a state where the vehicle body frame 21 leans leftward when seen from the rear of the vehicle body frame 21.

When a load is applied by a left foot to the left side member 53 through the left-foot-placing part 811, a force is exerted to the left side member 53 such that the left side member 53 is displaced in the downward direction of the vehicle body frame 21. Accordingly, leftward leaning of the vehicle body frame 21 can be suppressed in the left-right direction of the front two-wheel leaning vehicle 1.

On the other hand, when the vehicle body frame 21 leans to the right of the front two-wheel leaning vehicle 1, the right side member 54 is located above the left side member 53 in the top-bottom direction of the vehicle body frame 21. When a load is applied by a right foot to the right side member 54 through the right-foot-placing part 821, a force is exerted to the right side member 54 such that the right side member 54 is displaced in the downward direction of the vehicle body frame 21. Accordingly, rightward leaning of the vehicle body frame 21 can be suppressed in the left-right direction of the front two-wheel leaning vehicle 1.

When the vehicle body frame 21 leans leftward or rightward from the upright state, the normal direction to the placing surface of the left-foot-placing part 811 and the normal direction to the placing surface of the right-foot-placing part 821 change. However, an angle formed by the direction in which the head pipe 211 extends (the direction in which the intermediate steering axis Z extends) and the placing surface of the left-foot-placing part 811 and the placing surface of the right-foot-placing part 821 does not change. That is, the normal direction to the placing surface of the left-foot-placing part 811 and the normal direction to the placing surface of the right-foot-placing part 821 constantly coincide with the top-bottom direction of the vehicle body frame 21.

The left-right coupling member 83 couples the left-foot-placing part 811 and the right-foot-placing part 821 to each other in the left-right direction of the vehicle body frame 21 under the vehicle body frame 21. In the left-right direction of the vehicle body frame 21, a center portion of the left-right coupling member 83 is supported by a rotation support part 214c fixed to a lower portion of the under frame 214 of the vehicle body frame 21, to be rotatable about the under frame 214. Accordingly, in the top-bottom direction of the vehicle body frame 21, the left-right coupling member 83 leans in the top-bottom direction in accordance with upward or downward movement of the left-foot-placing part 811 and the right-foot-placing part 821.

In this manner, the left-foot-placing part 811 and the right-foot-placing part 821 move upward or downward in an interlocked manner in accordance with an input of a load from a left foot on the left-foot-placing part 811 or an input of a load from a right foot on the right-foot-placing part 821. Thus, with the input of a load from the left foot on the left-foot-placing part 811 or the input of a load from the right foot on the right-foot-placing part 821 described above, leftward or rightward leaning of the vehicle body frame 21 can be easily suppressed.

Figure 8:
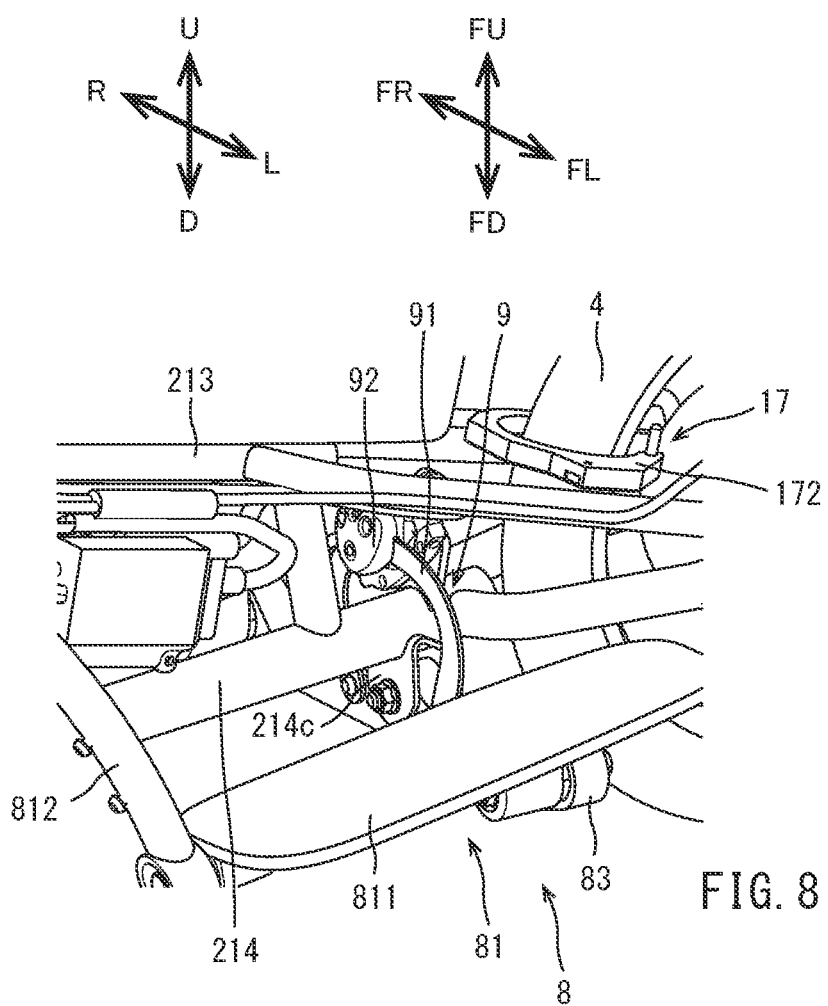
FIG. 8 is a perspective view illustrating a restriction mechanism in an enlarged manner.

As illustrated in FIGS. 1, 2, and 8, the restriction mechanism 9 includes a rotation part 91, a stopper part 92, and a lean lock lever 93 (see FIG. 2). FIG. 8 is a perspective view illustrating the rotation part 91 and the stopper part 92 of the restriction mechanism 9 in an enlarged manner.

The rotation part 91 is displaced relative to the vehicle body frame 21. The stopper part 92 is not displaced relative to the vehicle body frame 21.

As illustrated in FIGS. 2 and 8, the rotation part 91 is a plate member formed by partially cutting off an annular ring, and is fixed to the left-right coupling member 83 coupling the left-foot-placing part 811 and the right-foot-placing part 821 to each other. Specifically, as illustrated in FIG. 8, both end portions of the rotation part 91 are fixed to the left-right coupling member 83 while extending over the under frame 214 and the rotation support part 214c of the vehicle body frame 21. The rotation support part 214c is provided in the under frame 214 and rotatably supports the left-right coupling member 83. Accordingly, in a case where the left-foot-placing part 811 and the right-foot-placing part 821 are displaced relative to the vehicle body frame 21 in the top-bottom direction of the vehicle body frame 21, the rotation part 91 also rotates about the rotation support part 214c together with the left-right coupling member 83.

As described above, since the rotation part 91 is disposed in a manner to extend over the under frame 214, the height of the vehicle body frame 21 can be reduced, and the size of the vehicle body frame 21 in the left-right direction can be reduced.

The stopper part 92 is fixed to the under frame 214. The stopper part 92 includes a caliper that sandwiches the rotation part 91 in the thickness direction. The stopper part 92 operates to hold the rotation part 91 in the thickness direction and apply a friction force to the rotation part 91, by a lock operation of the lean lock lever 93 attached to the steering shaft 652. The stopper part 92 operates to cancel holding of the rotation part 91 and eliminate or reduce a friction force to the rotation part 91 by an unlock operation of the lean lock lever 93.

An operation of the lean lock lever 93 is input to the stopper part 92 through a lean lock wire 94 (see FIG. 2). That is, the lean lock wire 94 connected to the lean lock lever 93 is connected to the stopper part 92.

In the restriction mechanism 9 having the configuration described above, leftward or rightward leaning of the vehicle body frame 21 of the front two-wheel leaning vehicle 1 can be restricted by operating the lean lock lever 93.

In this embodiment, by operating the lean lock lever 93, the stopper part 92 of the restriction mechanism 9 is operated and the rear-wheel-brake caliper 122 of the rear-wheel-braking mechanism 12 is also operated. That is, the restriction mechanism 9 and the rear-wheel-braking mechanism 12 can be interlocked with each other by operating the lean lock lever 93.

Figure 9:
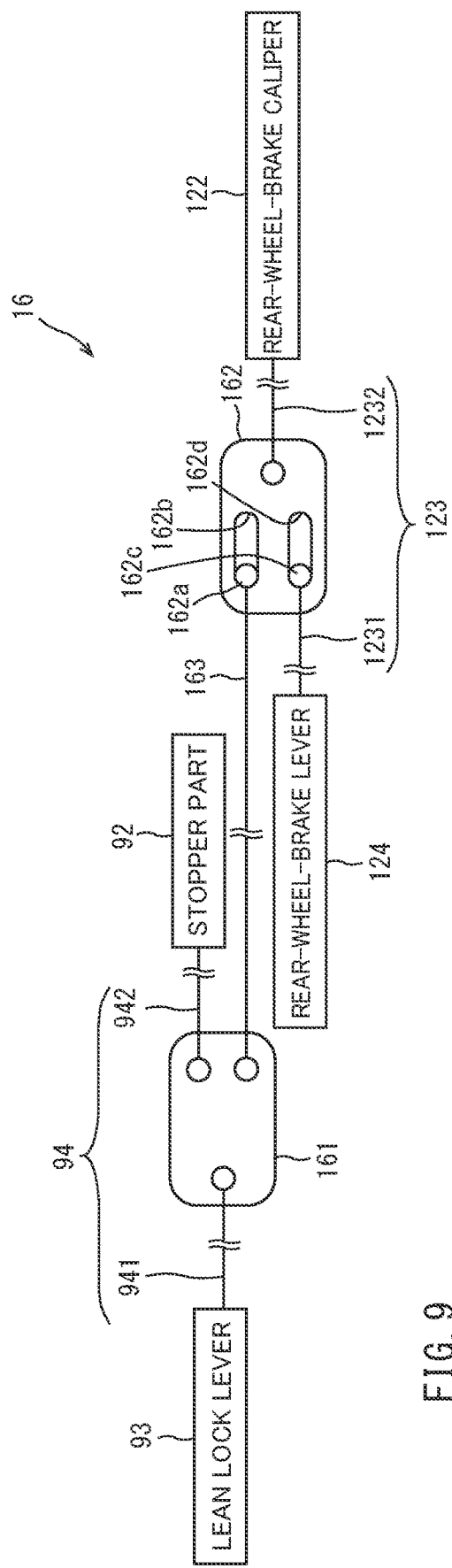
FIG. 9 is a view schematically illustrating a configuration of an interlocking mechanism.

FIG. 9 is a view schematically illustrating a general configuration of the interlocking mechanism 16. The interlocking mechanism 16 includes a first equalizer 161 and a second equalizer 162.

The lean lock lever 93 is connected to the stopper part 92 through the lean lock wire 94 and the first equalizer 161. Specifically, the lean lock wire 94 includes a first-lean-lock wire 941 and a second-lean-lock wire 942. The first-lean-lock wire 941 connects the lean lock lever 93 and the first equalizer 161 to each other. The second-lean-lock wire 942 connects the first equalizer 161 and the stopper part 92 to each other. The first equalizer 161 is located between the first-lean-lock wire 941 and the second-lean-lock wire 942. The direction in which the first-lean-lock wire 941 extends from the first equalizer 161 is opposite to the direction in which the second-lean-lock wire 942 extends from the first equalizer 161.

The expression "the direction in which the first-lean-lock wire 941 extends is opposite to the direction in which the second-lean-lock wire 942 extends" includes not only a case where an extension line of the first-lean-lock wire 941 and an extension line of the second-lean-lock wire 942 overlap with each other, but also a case where the extension line of the first-lean-lock wire 941 and the extension line of the second-lean-lock wire 942 intersect with each other. An angle of the intersection of the extension line of the first-lean-lock wire 941 and the extension line of the second-lean-lock wire 942 is preferably 45 degrees or less.

With the configuration described above, when the lean lock lever 93 is operated, an operating force is transferred to the stopper part 92 through the first-lean-lock wire 941, the first equalizer 161, and the second-lean-lock wire 942.

An interlock brake wire 163 is connected to the first equalizer 161 in parallel with the second-lean-lock wire 942. That is, the direction in which the interlock brake wire 163 extends from the first equalizer 161 is opposite to the direction in which the first-lean-lock wire 941 extends from the first equalizer 161. The interlock brake wire 163 connects the first equalizer 161 and a first connection part 162a of the second equalizer 162 to each other.

Accordingly, an operating force generated when the lean lock lever 93 is operated is transferred to the second equalizer 162 through the first-lean-lock wire 941, the first equalizer 161, and the interlock brake wire 163.

The second equalizer 162 has a first elongated hole 162b in which the first connection part 162a connected to the interlock brake wire 163 is located and a second elongated hole 162d in which a second connection part 162c connected to a first-rear-wheel-brake wire 1231 described later is located. The longitudinal direction of the first elongated hole 162b and the longitudinal direction of the second elongated hole 162d are the same direction. The expression "the same direction" includes not only a case where the longitudinal direction of the first elongated hole 162b is parallel to the longitudinal direction of the second elongated hole 162d but also a case where the longitudinal direction of the first elongated hole 162b intersects with the longitudinal direction of the second elongated hole 162d.

The first elongated hole 162b is a hole elongated in the direction in which the interlock brake wire 163 extends from the second equalizer 162. That is, the first connection part 162a is movable in the first elongated hole 162b in the direction in which the interlock brake wire 163 extends from the second equalizer 162.

Thus, in a case where the interlock brake wire 163 is pulled with respect to the second equalizer 162, a force is transferred to the second equalizer 162 through the interlock brake wire 163 and the first connection part 162a. On the other hand, in a case where the second equalizer 162 is pulled by the first-rear-wheel-brake wire 1231 described later, the first connection part 162a moves in the first elongated hole 162b. Thus, no force is transferred to the interlock brake wire 163.

The second elongated hole 162d is a hole elongated in the direction in which the first-rear-wheel-brake wire 1231 extends from the second equalizer 162. The second connection part 162c is movable in the second elongated hole 162d in the direction in which the first-rear-wheel-brake wire 1231 extends from the second equalizer 162.

Thus, in a case where the first-rear-wheel-brake wire 1231 is pulled with respect to the second equalizer 162, a force is transferred to the second equalizer 162 through the first-rear-wheel-brake wire 1231 and the second connection part 162c. On the other hand, in a case where the second equalizer 162 is pulled by the interlock brake wire 163, the second connection part 162c moves in the second elongated hole 162d. Thus, slack in the first-rear-wheel-brake wire 1231 can be prevented.

The first-rear-wheel-brake wire 1231 of the rear-wheel-brake wire 123 is connected to the second equalizer 162 in parallel with the interlock brake wire 163. The rear-wheel-brake wire 123 includes the first-rear-wheel-brake wire 1231 and a second-rear-wheel-brake wire 1232. The first-rear-wheel-brake wire 1231 connects the second equalizer 162 and the rear-wheel-brake lever 124 to each other. The second-rear-wheel-brake wire 1232 connects the second equalizer 162 and the rear-wheel-brake caliper 122 to each other. The direction in which the second-rear-wheel-brake wire 1232 extends from the second equalizer 162 is opposite to the direction in which the interlock brake wire 163 and the first-rear-wheel-brake wire 1231 extend from the second equalizer 162.

Accordingly, an operating force generated when the rear-wheel-brake lever 124 is operated is transferred to the rear-wheel-brake caliper 122 through the first-rear-wheel-brake wire 1231, the second equalizer 162, and the second-rear-wheel-brake wire 1232. At this time, the first connection part 162a to which the interlock brake wire 163 is connected moves in the first elongated hole 162b of the second equalizer 162. Thus, no force is transferred to the interlock brake wire 163.

An operating force generated when the lean lock lever 93 is operated is transferred to the rear-wheel-brake caliper 122 through the first-lean-lock wire 941, the first equalizer 161, the interlock brake wire 163, the second equalizer 162, and the second-rear-wheel-brake wire 1232.

With the configuration described above, the stopper part 92 of the restriction mechanism 9 and the rear-wheel-brake caliper 122 of the rear-wheel-braking mechanism 12 are interlocked with each other by operating the lean lock lever 93. In this manner, a driver can easily get on or off the front two-wheel leaning vehicle 1 with leftward and rightward leaning and forward and rearward movement of the front two-wheel leaning vehicle 1 restricted.

Figure 10:
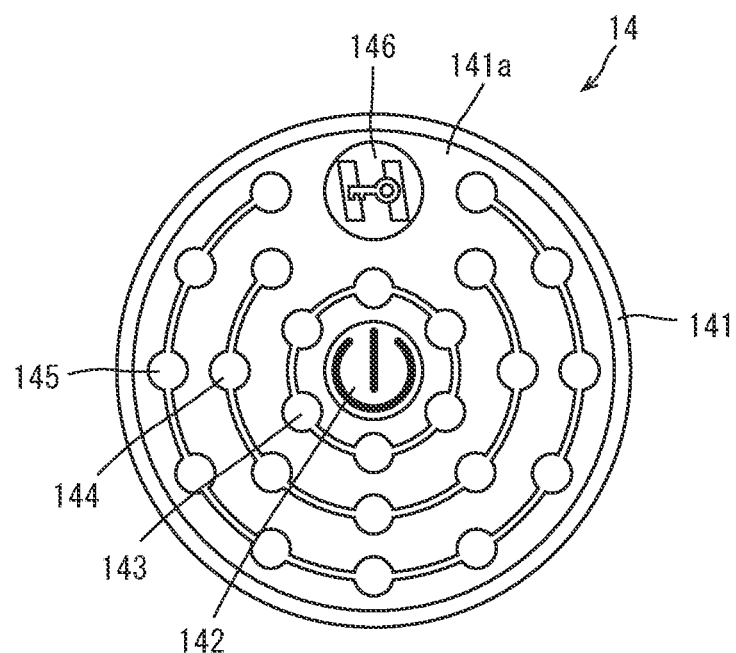
FIG. 10 is a plan view illustrating a configuration of a meter.

As illustrated in FIGS. 1 through 3 and 5, the meter 14 is attached to the handlebar 651. The meter 14 indicates a vehicle state, a battery remaining capacity, and a vehicle speed, for example, of the front two-wheel leaning vehicle 1 to a driver. In this embodiment, as illustrated in FIG. 10, the meter 14 includes a disc-shaped body 141. The body 141 includes a circular display surface 141a at a position facing the driver.

The meter 14 includes, on the display surface 141a, the power-supply-operation section 142, a vehicle-state-display section 143, a battery-remaining-capacity-display section 144, a vehicle-speed-display section 145, and a lean-lock-display section 146. Signal lines 149 for transmitting signals are connected to the meter 14 (see FIG. 13 described later). The signal lines 149 connect the meter 14 and the controller 18 described later.

The power-supply-operation section 142 communicates with, for example, a portable terminal of a driver wirelessly to thereby output a signal for turning the power supply of the front two-wheel leaning vehicle 1 on or off, to the controller 18. The power-supply-operation section 142 is located at a center portion of the display surface 141a of the meter 14. The power-supply-operation section 142 may be a button switch.

The vehicle-state-display section 143 displays a vehicle state of the front two-wheel leaning vehicle 1. The vehicle-state-display section 143 displays an abnormal state of the front two-wheel leaning vehicle 1 such as a non-travelable state or, if the front two-wheel leaning vehicle 1 is travelable but maintenance is needed, for example, displays a warning to the driver. The vehicle-state-display section 143 displays the abnormal state in red and the warning in yellow, for example. In this manner, by displaying the vehicle state of the front two-wheel leaning vehicle 1 with colors, the driver is capable of easily knowing the vehicle state of the front two-wheel leaning vehicle 1. The vehicle-state-display section 143 is formed in a circular shape surrounding the power-supply-operation section 142.

The battery-remaining-capacity-display section 144 displays a battery remaining capacity of the battery 221 of the front two-wheel leaning vehicle 1. The battery-remaining-capacity-display section 144 displays the battery remaining capacity of the battery 221 by changing an illuminating range in accordance with the battery remaining capacity of the battery 221, for example. Since the battery-remaining-capacity-display section 144 displays the battery remaining capacity of the battery 221 not with numerals but with the illuminated range as described above, the driver is capable of easily knowing the battery remaining capacity of the battery 221. The battery-remaining-capacity-display section 144 is formed in a circular shape surrounding the vehicle-state-display section 143.

The vehicle-speed-display section 145 displays a vehicle speed of the front two-wheel leaning vehicle 1. The vehicle-speed-display section 145 displays the vehicle speed of the front two-wheel leaning vehicle 1 by changing an illuminated range in accordance with the vehicle speed of the front two-wheel leaning vehicle 1, for example. Since the vehicle-speed-display section 145 displays the vehicle speed of the front two-wheel leaning vehicle 1 not with numerals but with the illuminated range, the driver is capable of easily knowing the vehicle speed of the front two-wheel leaning vehicle 1. The vehicle-speed-display section 145 is formed in a circular shape surrounding the battery-remaining-capacity-display section 144.

The lean-lock-display section 146 displays whether or not leftward or rightward leaning of the vehicle body frame 21 is restricted by the restriction mechanism 9 described later. The lean-lock-display section 146 illuminates in a case where leftward or rightward leaning of the vehicle body frame 21 is restricted by the restriction mechanism 9, for example.

Figure 11:
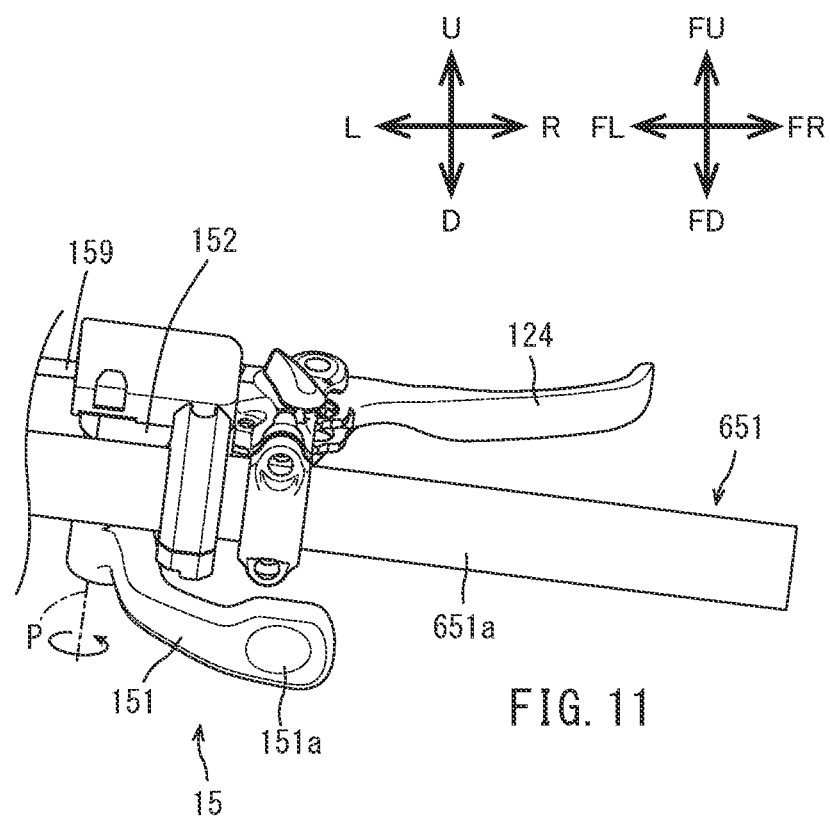
FIG. 11 is a view of a throttle device when seen from the rear of a vehicle body frame.

As illustrated in FIGS. 2, 5, and 11, the handlebar 651 is provided with the throttle device 15 that is operated by a finger(s) of the driver. As illustrated in FIG. 11, the throttle device 15 includes a throttle lever 151 and a throttle-lever-support part 152.

The throttle lever 151 includes a first end portion and a second end portion at both ends thereof in the longitudinal direction. The first end portion of the throttle lever 151 in the longitudinal direction is supported by the throttle-lever-support part 152 to be rotatable about a rotation axis P extending in the top-bottom direction of the vehicle body frame 21. The throttle lever 151 includes a pressing part 151a that is pressed by a finger(s) of the driver, at the second end portion in the longitudinal direction.

The throttle-lever-support part 152 rotatably supports the first end portion of the throttle lever 151 in the longitudinal direction, and outputs a rotation angle of the throttle lever 151 as a throttle signal. A signal line 159 is connected to the throttle lever 151. The signal line 159 connects the throttle-lever-support part 152 and the controller 18 described later to each other.

An operation amount of the throttle lever 151 is transmitted, as a throttle signal, to the controller 18 through the signal line 159. The controller 18 drives the power unit 22 in accordance with the throttle signal. Thus, the power unit 22 can be driven in accordance with the operation amount of the throttle lever 151.

As described above, the throttle device 15 including the throttle lever 151 configured to be operated by a finger(s) of the driver is used to control driving of the power unit 22, thereby enhancing operability in throttle operation.

In a case where the front two-wheel leaning vehicle 1 is capable of traveling rearward as well as forward, a forward or rearward throttle signal can be easily output from the throttle device in accordance with a rotation direction of a throttle lever 251, as illustrated in FIG. 12. FIG. 12 is a view schematically illustrating another example of the throttle lever, i.e., the throttle lever 251.

The throttle lever 251 includes a first pressing part 251*a* and a second pressing part 251*b* at a second end portion in the longitudinal direction. The first pressing part 251*a* is located at the front of the second pressing part 251*b* in the front-rear direction of the vehicle body frame 21.

When the driver pushes the second pressing part 251*b* of the throttle lever 251 forward to cause the throttle lever 251 to rotate toward the front of the vehicle body frame 21 about the rotation axis P extending in the top-bottom direction of the vehicle body frame 21 (i.e., to rotate in a direction b1 in FIG. 12), a throttle-lever-support part 252 outputs a forward throttle signal. When the driver pulls the second pressing part 251*b* of the throttle lever 251 rearward to cause the throttle lever 251 to rotate toward the rear of the vehicle body frame 21 about the rotation axis P (i.e., to rotate in a direction b2 in FIG. 12), the throttle-lever-support part 252 outputs a rearward throttle signal. Accordingly, by operating the throttle lever 251, the front two-wheel leaning vehicle 1 can be easily moved forward or rearward.

The throttle-lever-support part 252 may output a regeneration brake signal when the throttle lever 251 is rotated about the rotation axis P toward the rear of the vehicle body frame 21. The regeneration brake signal is a signal with which the controller 18 causes the motor to perform a regeneration operation.

The controller 18 controls driving of the front two-wheel leaning vehicle 1.

Specifically, the controller 18 controls display of the meter 14 such that the meter 14 displays a vehicle state of the front two-wheel leaning vehicle 1. The controller 18 also controls driving of the power unit 22 based on a throttle signal output from the throttle-lever-support part 152 in accordance with an operation of the throttle lever 151. The controller 18 also controls driving of the lock mechanism 17, for example.

(Steering Shaft)

A configuration of the steering shaft 652 of the steering member will now be specifically described with reference to FIGS. 1 and 13 through 15.

Figure 13:
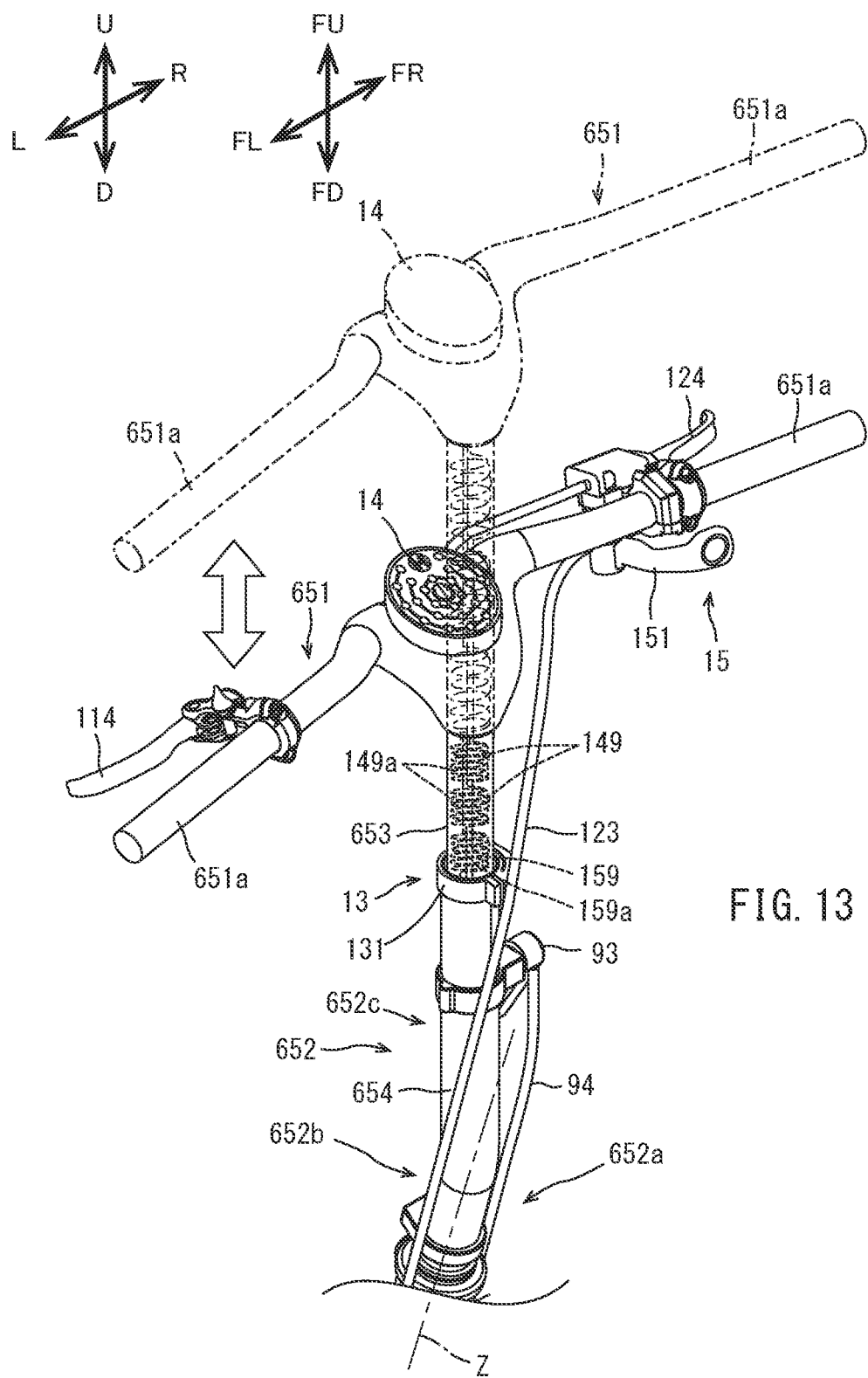
FIG. 13 is a view schematically illustrating a state where a position of a handlebar is changed by a handle adjusting mechanism.
Figure 14:
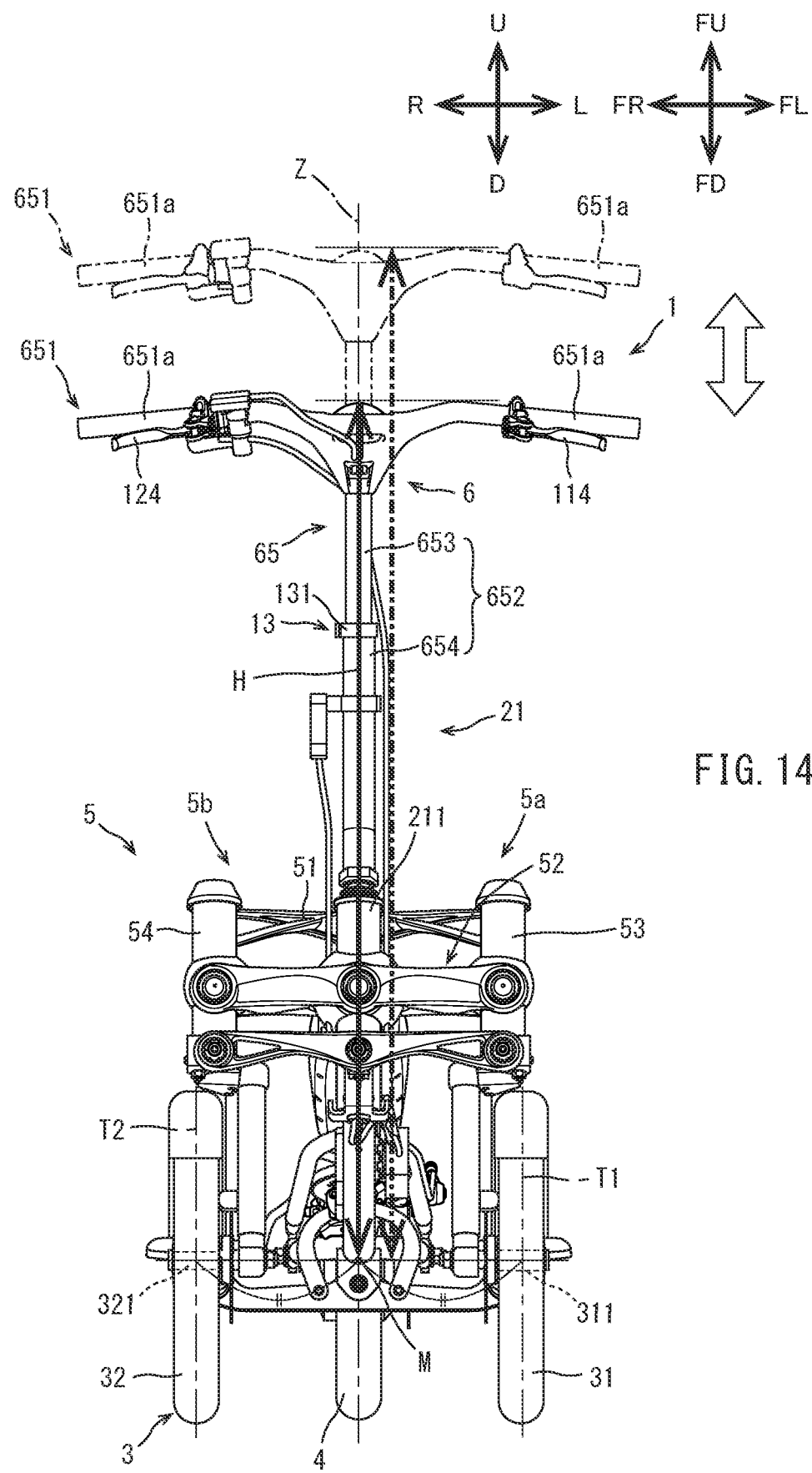
FIG. 14 is a view corresponding to FIG. 2 and schematically illustrating a state where the position of the handlebar is changed by the handle adjusting mechanism.
Figure 15:
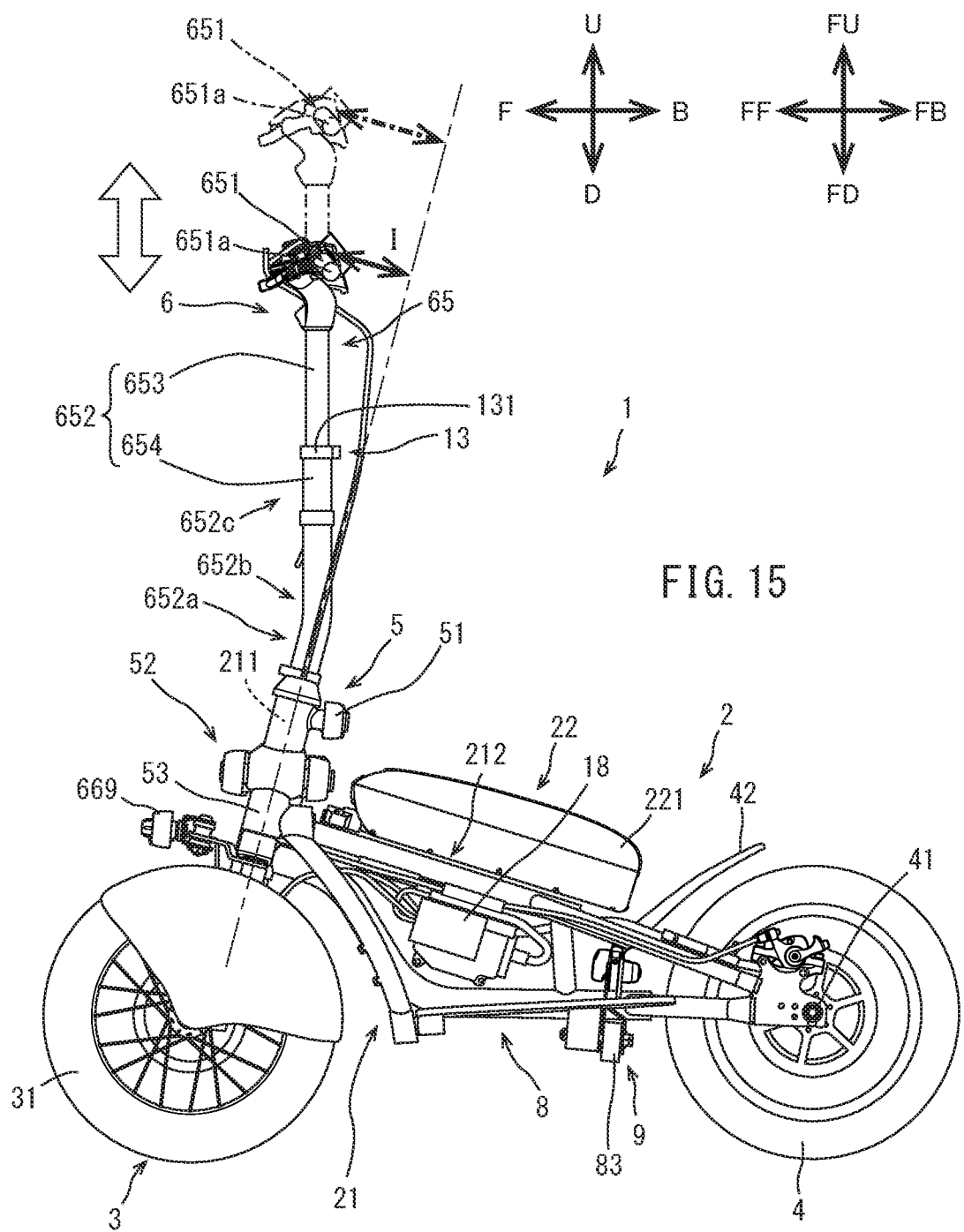
FIG. 15 is a view corresponding to FIG. 1 and schematically illustrating a state where the position of the handlebar is changed by the handle adjusting mechanism.

FIG. 13 is an enlarged view illustrating the steering shaft 652 and the handlebar 651 in a case where the height of the handlebar 651 is changed. FIG. 14 is a front view of the front two-wheel leaning vehicle 1 seen from the front in the case where the height of the handlebar 651 is changed. FIG. 15 is a left side view of the front two-wheel leaning vehicle 1 seen from the left in the case where the height of the handlebar 651 is changed.

In FIGS. 13 through 15, the handlebar 651 and the steering shaft 652 in the case where the height of the handlebar 651 is changed are indicated by dot-dash lines. In FIGS. 13 through 15, a direction in which the height of the handlebar 651 is changed is indicated by white arrows.

Figure 16:
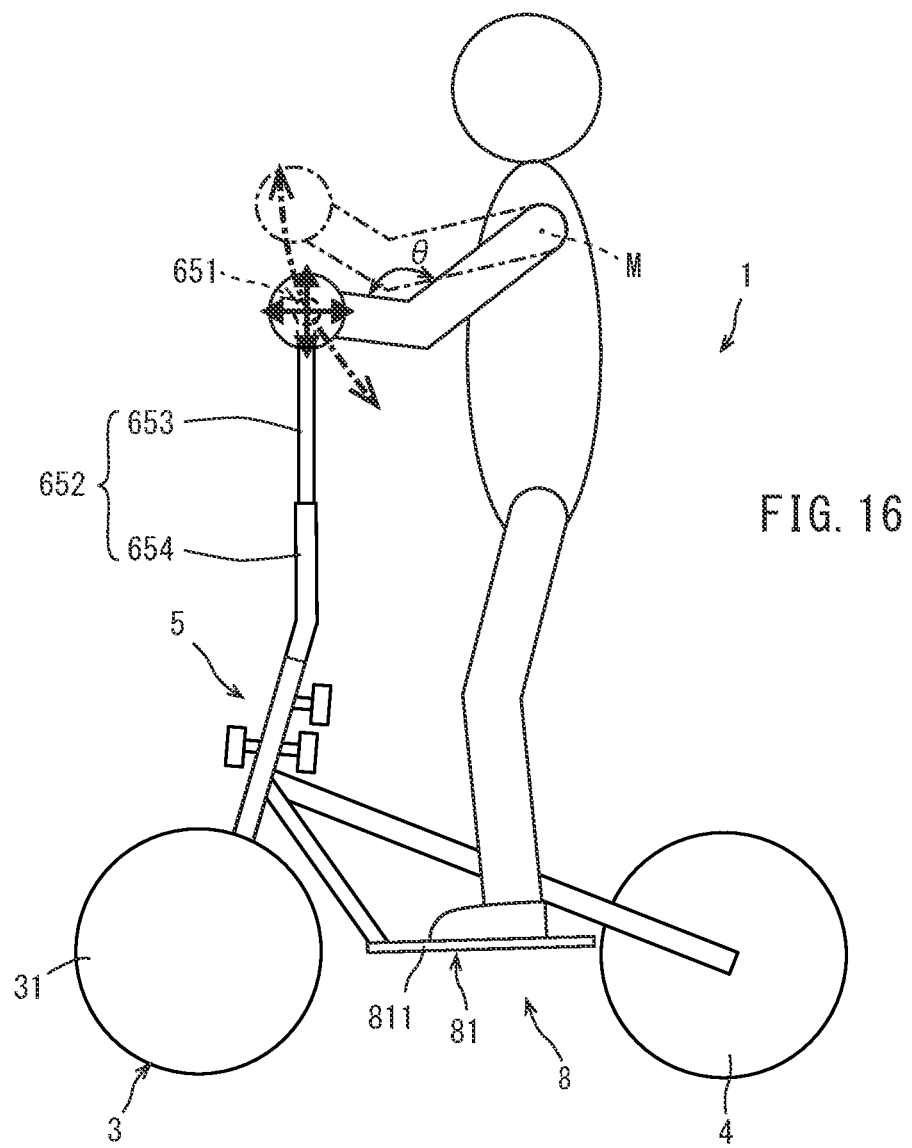
FIG. 16 is a left side view schematically illustrating a relationship between a rotation range of arms of a driver in a top-bottom direction and the position of the handlebar in a case where the driver is an adult.
Figure 17:
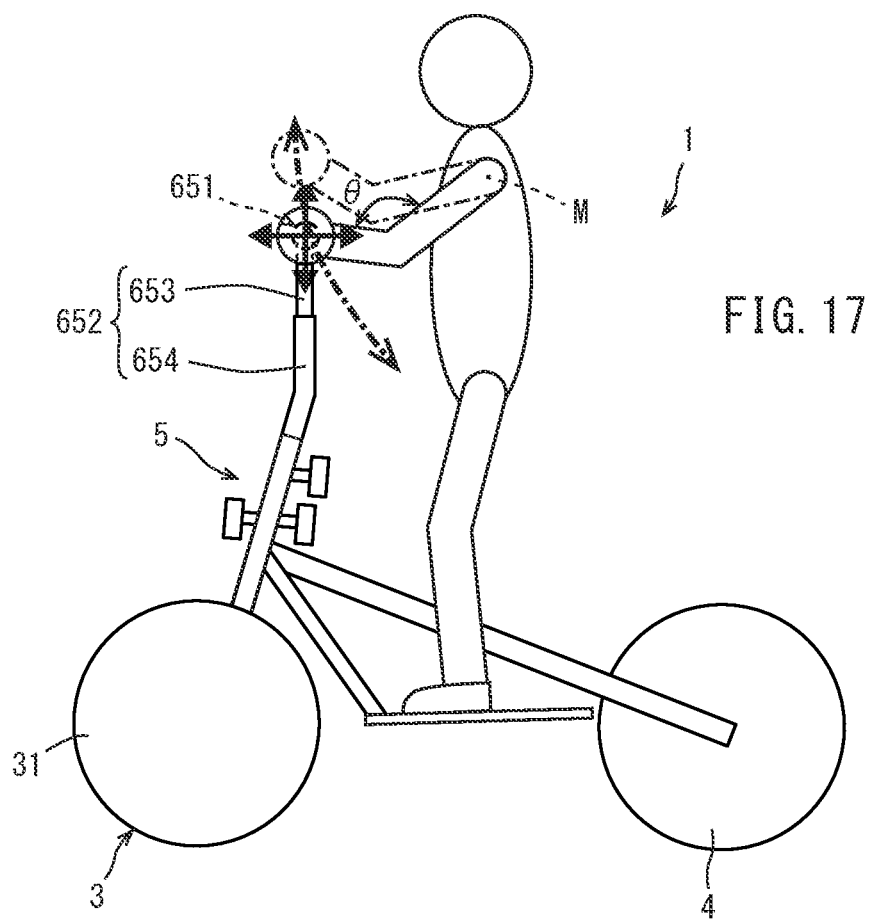
FIG. 17 is a left side view schematically illustrating a relationship between a rotation range of arms of a driver in a top-bottom direction and the position of the handlebar in a case where the driver is a child.

FIG. 16 is a left side view schematically illustrating a relationship between a rotation range of arms of a driver and the position of the handlebar 651 in a case where the driver is an adult. FIG. 17 is a left side view schematically illustrating a relationship between a rotation range of arms of a driver and the position of the handlebar 651 in a case where the driver is a child. In FIGS. 16 and 17, the rotation range of arms of the driver in the top-bottom direction is indicated by arrows of dot-dash lines.

Figure 20:
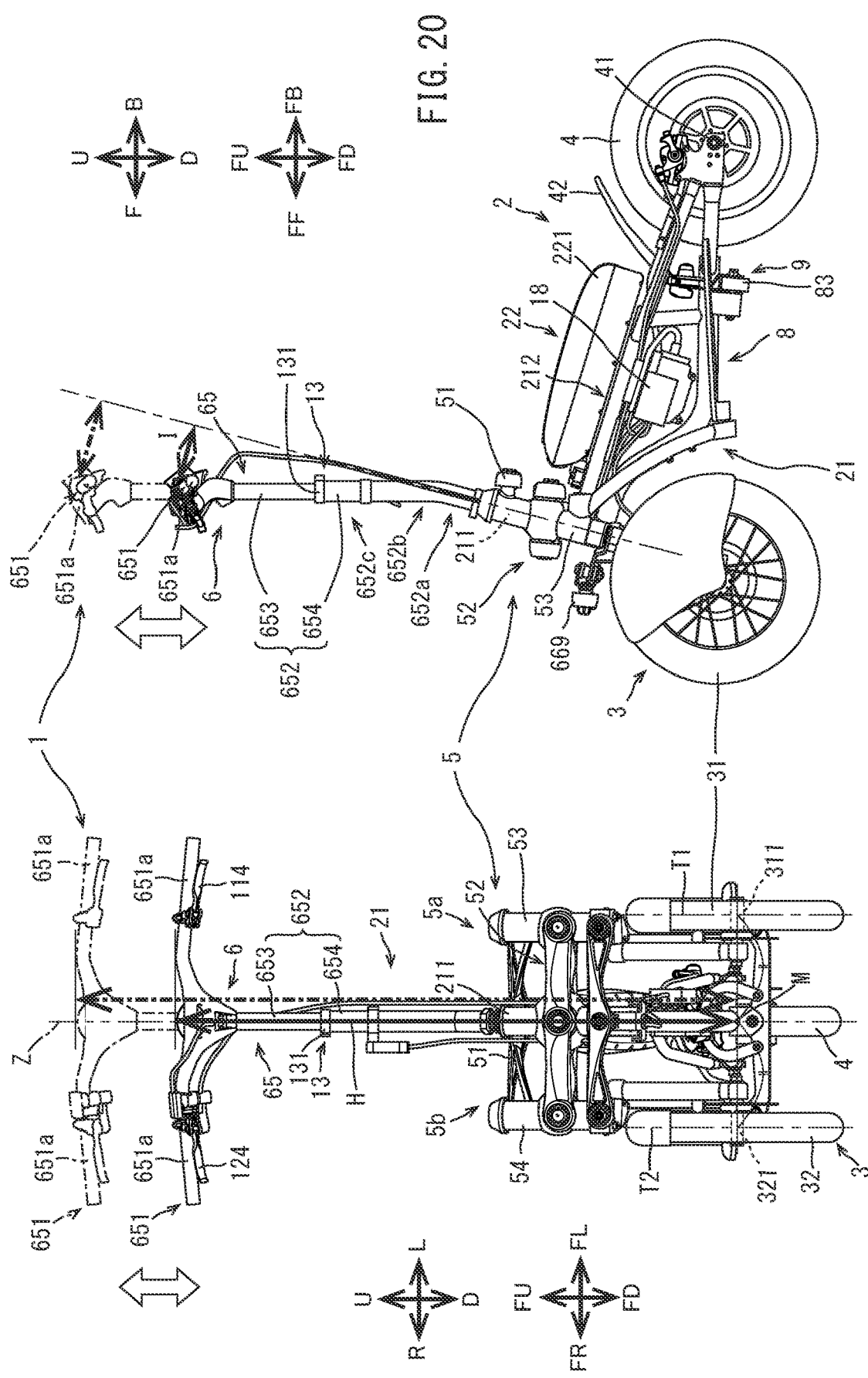
FIG. 20 is a view schematically illustrating a state where a position of a handlebar is changed by a handle adjusting mechanism.

FIG. 20 also illustrates the front two-wheel leaning vehicle 1 in the case where the height of the handlebar 651 is changed, and the configuration illustrated in FIG. 20 is similar to the configurations illustrated in FIGS. 14 and 15. Thus, detailed description of FIG. 20 will be omitted.

As illustrated in FIGS. 13 through 15, when the vehicle body frame 21 is seen from the left, the steering shaft 652 is bent in an intermediate portion toward the front of the vehicle body frame 21 in the top-bottom direction of the vehicle body frame 21. That is, a portion of the steering shaft 652 located above the intermediate portion of the steering shaft 652 extends in the top-bottom direction of the vehicle body frame 21.

Specifically, the steering shaft 652 includes a steering-shaft-lower portion 652*a*, a steering-shaft-bent portion 652*b*, and a steering-shaft-upper portion 652*c*.

The steering-shaft-lower portion 652*a* is partially rotatably supported by the head pipe 211, and extends from the head pipe 211 upward in the top-bottom direction of the vehicle body frame 21 and rearward in the front-rear direction of the vehicle body frame 21. That is, the steering-shaft-lower portion 652*a* extends from the head pipe 211 located in a front portion of the vehicle body frame 21 in the direction in which the head pipe 211 extends. The direction in which the steering-shaft-lower portion 652*a* extends is the axial direction of the intermediate steering axis Z.

The steering-shaft-upper portion 652*c* extends from the upper end of the steering-shaft-lower portion 652*a* forward in the front-rear direction of the vehicle body frame 21 and upward in the top-bottom direction of the vehicle body frame 21. The handlebar 651 is connected to the upper end of the steering-shaft-upper portion 652*c*. The grip 651*a* of the handlebar 651 is located at a distance I with respect to an extension line of the intermediate steering axis Z when the vehicle body frame 21 is seen from the left. The distance I is a minimum distance between the upper end of the grip 651*a* and the extension line of the intermediate steering axis Z when the vehicle body frame 21 is seen from the left. The distance I is an offset amount with respect to the intermediate steering axis Z that is a rotation axis of the steering shaft 652.

The steering-shaft-bent portion 652*b* is located between the upper end of the steering-shaft-lower portion 652*a* and the lower end of the steering-shaft-upper portion 652*c*. That is, the steering-shaft-bent portion 652*b* is a portion that bends forward in the front-rear direction of the vehicle body frame 21 and upward in the top-bottom direction of the vehicle body frame 21 with respect to the steering-shaft-lower portion 652*a*.

The steering shaft 652 includes an inner pipe 653 constituting a part of the steering-shaft-upper portion 652*c*, and an outer pipe 654 constituting the rest of the steering-shaft-upper portion 652*c*, the steering-shaft-bent portion 652*b*, and the steering-shaft-lower portion 652*a*.

An upper portion of the inner pipe 653 is connected to the handlebar 651. A lower portion of the inner pipe 653 is located inside an upper portion of the outer pipe 654. As illustrated in FIGS. 1 and 13, a lower portion of the outer pipe 654 constituting the steering-shaft-lower portion 652*a* extends in the direction in which the intermediate steering axis Z extends when the vehicle body frame 21 is seen from the left. An upper portion of the outer pipe 654 constituting the rest of the steering-shaft-upper portion 652*c* extends in the top-bottom direction of the vehicle body frame 21 when the vehicle body frame 21 is seen from the left. That is, the upper portion of the outer pipe 654 is bent toward the front of the vehicle body frame 21 with respect to a lower portion of the outer pipe 654, when the vehicle body frame 21 is seen from the left. A part of the lower portion of the outer pipe 654 is rotatably supported by the head pipe 211.

The inner pipe 653 and the outer pipe 654 are fixed by a fixing member 131 in a state where a lower portion of the inner pipe 653 is located inside the outer pipe 654. The fixing member 131 is located at an upper end portion of the outer pipe 654. That is, the fixing member 131 is located at the steering-shaft-upper portion 652c. The fixing member 131 retains the inner pipe 653 inside the outer pipe 654 by applying a fastening force to an upper end portion of the outer pipe 654 in a radial direction.

A structure of the fixing member 131 may be a structure that generates the fastening force by fastening a bolt or a structure that generates the fastening force by using the principle of leverage with a lever operation. That is, the fixing member 131 may have any structure as long as the inner pipe 653 is capable of being fixed to the outer pipe 654.

As illustrated in FIG. 13, in the steering shaft 652 having the structure described above, the length of the steering-shaft-upper portion 652c is changeable by changing a position of the inner pipe 653 relative to the outer pipe 654 in the direction in which the inner pipe 653 extends. That is, the steering shaft 652 includes the handle adjusting mechanism 13 capable of adjusting the position of the handlebar 651 by extending and contracting the steering-shaft-upper portion 652c in the direction in which the inner pipe 653 extends.

As illustrated in FIG. 14, since the steering shaft 652 includes the handle adjusting mechanism 13 as described above, it is possible to change a handle height H that is a distance in the top-bottom direction of the vehicle body frame 21 from a midpoint M between the left front wheel 31 and the right front wheel 32 in the left-right direction of the vehicle body frame 21 to the grip 651a of the handlebar 651. The handle height H is a distance in the top-bottom direction of the vehicle body frame 21 from the midpoint M to the upper end of the grip 651a. The midpoint M is a point located on a line connecting the rotation centers of the left front wheel 31 and the right front wheel 32 when the vehicle body frame 21 is seen from the front and located equidistant from a tread center T1 of the left front wheel 31 and a tread center T2 of the right front wheel 32 in the left-right direction of the vehicle body frame 21, in a state where the front two-wheel leaning vehicle 1 stands upright.

In addition, since the steering shaft 652 includes the handle adjusting mechanism 13 as described above, the offset amount of the handlebar 651 with respect to the intermediate steering axis Z of the steering shaft 652 can be changed in the front-rear direction of the vehicle body frame 21. The offset amount is the distance I between the upper end of the grip 651a and the extension line of the intermediate steering axis Z when the vehicle body frame 21 is seen from the left.

While the front two-wheel leaning vehicle 1 is stationary, a driver balances the front two-wheel leaning vehicle 1 in the left-right direction by moving the handlebar 651 in the left direction or in the right direction of the vehicle body frame 21. The movement of the handlebar 651 in the left-right direction is affected by the handle height H. Thus, it is possible to change operational feeling of the handlebar 651 in moving the handlebar 651 in the left direction or in the right direction while the vehicle is stationary, by adjusting the handle height H.

While the front two-wheel leaning vehicle 1 is traveling at an extremely low speed, the front two-wheel leaning vehicle 1 is caused to turn by rotating the handlebar 651 of the front two-wheel leaning vehicle 1 in some cases. Rotation of the handlebar 651 is affected by the offset amount (distance I) of the handlebar 651 with respect to the steering shaft 652 in the front-rear direction of the vehicle body frame 21. Thus, it is possible to change operational feeling of the handlebar 651 in rotating the handlebar 651 while the front two-wheel leaning vehicle 1 is traveling at an extremely low speed, by adjusting the offset amount.

As illustrated in FIG. 16, in a state where a driver rides on the front two-wheel leaning vehicle 1, the position of the feet of the driver with respect to the front two-wheel leaning vehicle 1 is fixed. The arms of the driver on the front two-wheel leaning vehicle 1 rotate about shoulders in the top-bottom direction, and thus, the rotation center M of the arms of the driver is uniquely fixed. That is, once the position of the feet of the driver with respect to the front two-wheel leaning vehicle 1 is fixed, the rotation range (range indicated by arrows of dot-dash line in FIG. 16) of the arms of the driver in the top-bottom direction is also fixed.

In the rotation range of the arms of the driver in the top-bottom direction, the driver can easily operate the front two-wheel leaning vehicle 1 at a certain position of the handlebar 651 (hereinafter referred to as a handle position). The handle position is a position of the handlebar 651 in which the angle of elbows of the driver is a predetermined angle θ at which movement and rotation of the handlebar 651 in the left direction or in the right direction are allowable. Thus, from the viewpoint of operability of the front two-wheel leaning vehicle 1, the position of the handlebar 651 of the front two-wheel leaning vehicle 1 is preferably set at the handle position described above.

The handle position is a position in which the range of movement of the handlebar 651 and the rotation angle of the arms of the driver in the top-bottom direction intersect with each other. Thus, as described above, the handle adjusting mechanism 13 adjusts the positions of the handlebar 651 in the top-bottom direction and in the front-rear direction so that the position of the handlebar 651 can be thereby set at the handle position.

As illustrated in FIG. 17, even in the case where the driver of the front two-wheel leaning vehicle is a child, in a manner similar to the case where the driver is an adult (the case of FIG. 16), the handle adjusting mechanism 13 adjusts the positions of the handlebar 651 in the top-bottom direction and in the front-rear direction so that the position of the handlebar 651 can be thereby set at the handle position in which the driver can easily operate the front two-wheel leaning vehicle 1.

As described above, by adjusting the handle height H and the offset amount with the handle adjusting mechanism 13, the handle position can be set at a position in which the driver can easily operate the front two-wheel leaning vehicle 1. In this manner, it is possible to enhance operational feeling of the handlebar 651 in a speed range from the stationary state to the extremely low speed of the front two-wheel leaning vehicle 1.

The stationary state means that the speed of the vehicle is zero. The extremely low speed means a speed at which the front two-wheel leaning vehicle 1 is caused to turn not by leftward leaning or rightward leaning of the front two-wheel leaning vehicle 1 but by rotation of the handlebar 651.

As illustrated in FIG. 13, the two signal lines 149 of the meter 14 and the signal line 159 of the throttle device 15 are disposed inside the inner pipe 653 and the outer pipe 654. The two signal lines 149 of the meter 14 and the signal line 159 of the throttle device 15 include helically wound curl cords 149a and 159a, respectively. In this embodiment, the curl cords 149a of the signal lines 149 of the meter 14 and the curl cord 159a of the signal line 159 of the throttle device 15 are disposed inside at least one of the inner pipe 653 or the outer pipe 654.

In this manner, in the case where the handle adjusting mechanism 13 extends or contracts the inner pipe 653 of the steering shaft 652 with respect to the outer pipe 654, it is possible to prevent hindering of extension or contraction of the inner pipe 653 by the signal lines 149 of the meter 14 and the signal line 159 of the throttle device 15. In addition, the signal lines 149 of the meter 14 and the signal line 159 of the throttle device 15 can be housed in a compact space in the steering shaft 652.

In addition, since the curl cords 149a and 159a are disposed inside the steering shaft 652, entering of electromagnetic waves into the steering shaft 652 from the outside can be suppressed by the steering shaft 652. Accordingly, it is possible to suppress generation of noise by external electromagnetic waves in signals transmitted to the signal lines 149 and 159. Thus, parts for preventing occurrence of signal noise by external electromagnetic waves can be reduced in number or can be omitted. In this manner, manufacturing costs and the weight of the front two-wheel leaning vehicle 1 can be reduced.

Although the number of the signal lines 149 of the meter 14 is two in this embodiment, but the number of the signal lines 149 may be one or three or more. Another signal line may be disposed inside the inner pipe 653 and the outer pipe 654.

In this embodiment, the meter 14 and the throttle device 15 are terminals, and the controller 18 is an electric component. The terminal may be another part as long as the part can be attached to the handlebar 651 and connected to an electric component attached to the vehicle body frame 21 via a signal line. The electric component may be another part as long as the part can be attached to the vehicle body frame 21 and connected to the terminal attached to the handlebar 651 via a signal line.

OTHER EMBODIMENTS

The embodiment of the present teaching has been described above, but the embodiment is merely an example for carrying out the present teaching. Thus, the present teaching is not limited to the embodiment described above, and the embodiment may be modified as necessary within a range not departing from the gist of the present teaching.

In the embodiment, the steering-shaft-upper portion 652c is provided with the fixing member 131 for fixing the inner pipe 653 to the outer pipe 654. That is, the handle adjusting mechanism 13 adjusts the position of the handlebar 651 by changing the length of the steering-shaft-upper portion 652c.

Alternatively, the handle adjusting mechanism may change the length of the steering-shaft-lower portion or may change the lengths of the steering-shaft-upper portion and the steering lower portion.

FIG. 18 illustrates an example of the handle adjusting mechanism capable of adjusting the length of the steering-shaft-lower portion. FIG. 18 schematically illustrates the left front wheel 31, a steering shaft 1652, and the handlebar 651 for description.

The steering shaft 1652 includes a steering-shaft-lower portion 1652a, a steering-shaft-bent portion 1652b, and a steering-shaft-upper portion 1652c.

The steering-shaft-lower portion 1652a is partially rotatably supported by the head pipe 211, and extends from the head pipe 211 upward in the top-bottom direction of the vehicle body frame and rearward in the front-rear direction of the vehicle body frame.

The steering-shaft-upper portion 1652c extends from the upper end of the steering-shaft-lower portion 1652a forward in the front-rear direction of the vehicle body frame and upward in the top-bottom direction of the vehicle body frame. The handlebar 651 is connected to the upper end of the steering-shaft-upper portion 1652c. The grip 651a of the handlebar 651 is located at a distance I with respect to an extension line of the intermediate steering axis Z when the vehicle body frame is seen from the left. The distance I is a minimum distance between the upper end of the grip 651a and the extension line of the intermediate steering axis Z when the vehicle body frame is seen from the left. The distance I is an offset amount with respect to the intermediate steering axis Z that is a rotation axis of the steering shaft 1652.

The steering-shaft-bent portion 1652b is located between the upper end of the steering-shaft-lower portion 1652a and the lower end of the steering-shaft-upper portion 1652c. That is, the steering-shaft-bent portion 1652b is a portion that bends forward in the front-rear direction of the vehicle body frame and upward in the top-bottom direction of the vehicle body frame with respect to the steering-shaft-lower portion 1652a.

The steering shaft 1652 includes an outer pipe 1654 constituting a part of the steering-shaft-lower portion 1652a, and an inner pipe 1653 constituting the steering-shaft-upper portion 1652c, the steering-shaft-bent portion 1652b, and the rest of the steering-shaft-lower portion 1652a.

An upper portion of the inner pipe 1653 is connected to the handlebar 651. A lower portion of the inner pipe 1653 is located inside an upper portion of the outer pipe 1654. As illustrated in FIG. 18, the outer pipe 1654 and a part of the inner pipe 1653 constituting the steering-shaft-lower portion 1652a extend in the direction in which the intermediate steering axis Z extends when the vehicle body frame is seen from the left. An upper portion of the inner pipe 1653 constituting the steering-shaft-upper portion 1652c extends in the top-bottom direction of the vehicle body frame when the vehicle body frame is seen from the left. That is, an upper portion of the inner pipe 1653 is bent toward the front of the vehicle body frame with respect to a lower portion of the inner pipe 1653, when the vehicle body frame is seen from the left. A part of the lower portion of the outer pipe 1654 is rotatably supported by the head pipe 211.

The inner pipe 1653 and the outer pipe 1654 are fixed by a fixing member 1131 in a state where a lower portion of the inner pipe 1653 is located inside the outer pipe 1654. The fixing member 1131 is located at an upper end portion of the outer pipe 1654. That is, the fixing member 1131 is located at the steering-shaft-lower portion 1652a. The fixing member 1131 retains the inner pipe 1653 inside the outer pipe 1654 by applying a fastening force to an upper end portion of the outer pipe 1654 in a radial direction.

A structure of the fixing member 1131 may be a structure that generates the fastening force by fastening a bolt or a structure that generates the fastening force by using the principle of leverage with a lever operation. That is, the fixing member 1131 may have any structure as long as the inner pipe 1653 is capable of being fixed to the outer pipe 1654.

As illustrated in FIG. 18, in the steering shaft 1652 having the structure described above, the length of the steering-shaft-lower portion 1652a is changeable by changing the position of the inner pipe 1653 with respect to the outer pipe 1654 in the direction in which the intermediate steering axis Z extends. That is, the steering shaft 1652 includes a handle adjusting mechanism 1013 capable of adjusting the position of the handlebar 651 by extending and contracting the steering-shaft-lower portion 1652a in the direction in which the inner pipe 1653 extends.

As illustrated in FIG. 18, since the steering shaft 1652 includes the handle adjusting mechanism 1013 as described above, it is possible to change the handle height H that is a distance in the top-bottom direction of the vehicle body frame from the midpoint M between the left front wheel 31 and the right front wheel 32 in the left-right direction of the vehicle body frame to the grip 651a of the handlebar 651. The definition of the handle height H is the same as that of the handle height H in the embodiment described above.

In the example illustrated in FIG. 18, even in the case where the position of the inner pipe 1653 with respect to the outer pipe 1654 is changed by the handle adjusting mechanism 1013, the offset amount (distance I) of the handlebar 651 with respect to the extension line of the intermediate steering axis Z of the steering shaft 1652 does not change in the front-rear direction of the vehicle body frame.

As described above, it is possible to enhance operational feeling of the handlebar 651 in a speed range from the stationary state to the extremely low speed of the front two-wheel leaning vehicle by adjusting the handle height H.

FIG. 19 illustrates an example of the handle adjusting mechanism capable of adjusting lengths of the steering-shaft-upper portion and the steering-shaft-lower portion. FIG. 19 schematically illustrates the left front wheel 31, a steering shaft 2652, and the handlebar 651 for description.

The steering shaft 2652 includes a steering-shaft-lower portion 2652a, a steering-shaft-bent portion 2652b, and a steering-shaft-upper portion 2652c.

The steering-shaft-lower portion 2652a is partially rotatably supported by the head pipe 211, and extends from the head pipe 211 upward in the top-bottom direction of the vehicle body frame and rearward in the front-rear direction of the vehicle body frame.

The steering-shaft-upper portion 2652c extends from the upper end of the steering-shaft-lower portion 2652a forward in the front-rear direction of the vehicle body frame and upward in the top-bottom direction of the vehicle body frame. The handlebar 651 is connected to the upper end of the steering-shaft-upper portion 2652c. The grip 651a of the handlebar 651 is located at a distance I with respect to an extension line of the intermediate steering axis Z when the vehicle body frame is seen from the left. The distance I is a minimum distance between the upper end of the grip 651a and the extension line of the intermediate steering axis Z when the vehicle body frame is seen from the left. The distance I is an offset amount with respect to the intermediate steering axis Z that is a rotation axis of the steering shaft 2652.

The steering-shaft-bent portion 2652b is located between the upper end of the steering-shaft-lower portion 2652a and the lower end of the steering-shaft-upper portion 2652c. That is, the steering-shaft-bent portion 2652b is a portion that bends forward in the front-rear direction of the vehicle body frame and upward in the top-bottom direction of the vehicle body frame with respect to the steering-shaft-lower portion 2652a.

The steering shaft 2652 includes an outer pipe 2654 constituting a part of the steering-shaft-lower portion 2652a, and an inner pipe 2653 constituting the steering-shaft-upper portion 2652c, the steering-shaft-bent portion 2652b, and the rest of the steering-shaft-lower portion 2652a.

An upper portion of the inner pipe 2653 is connected to the handlebar 651. A lower portion of the inner pipe 2653 is located inside an upper portion of the outer pipe 2654. The inner pipe 2653 is capable of extending and contracting in the axial direction.

That is, the inner pipe 2653 includes a first inner pipe 2653a and a second inner pipe 2653b. A lower portion of the first inner pipe 2653a is located inside an upper portion of the second inner pipe 2653b. The first inner pipe 2653a and the second inner pipe 2653b are fixed by a first fixing member 2131 in a state where the lower portion of the first inner pipe 2653a is located inside the second inner pipe 2653b. The first fixing member 2131 is located at an upper end portion of the second inner pipe 2653b. That is, the first fixing member 2131 is located at the steering-shaft-upper portion 2652c. The first fixing member 2131 retains the first inner pipe 2653a inside the second inner pipe 2653b by applying a fastening force to the upper end portion of the second inner pipe 2653b in the radial direction, In this manner, the position of the first inner pipe 2653a with respect to the second inner pipe 2653b can be changed. Accordingly, the length of the inner pipe 2653 in the axial direction can be changed.

An upper portion of the first inner pipe 2653a is connected to the handlebar 651. A lower portion of the second inner pipe 2653b is located inside an upper portion of the outer pipe 2654. The first inner pipe 2653a and a part of the second inner pipe 2653b constitute the steering-shaft-upper portion 2652c. The second inner pipe 2653b constitutes the steering-shaft-bent portion 2652b and a part of the steering-shaft-lower portion 2652a.

As illustrated in FIG. 19, the outer pipe 2654 constituting a part of the steering-shaft-lower portion 2652a and the second inner pipe 2653b constituting the rest of the steering-shaft-lower portion 2652a extend in the direction in which the intermediate steering axis Z extends when the vehicle body frame is seen from the left. An upper portion of the inner pipe 2653 constituting the steering-shaft-upper portion 2652c extends in the top-bottom direction of the vehicle body frame when the vehicle body frame is seen from the left. That is, an upper portion of the inner pipe 2653 is bent toward the front of the vehicle body frame with respect to a lower portion of the inner pipe 2653, when the vehicle body frame is seen from the left. A part of the lower portion of the outer pipe 2654 is rotatably supported by the head pipe 211.

The second inner pipe 2653b of the inner pipe 2653 and the outer pipe 2654 are fixed by a second fixing member 2132 in a state where a lower portion of the second inner pipe 2653b is located inside the outer pipe 2654. The second fixing member 2132 is located at an upper end portion of the outer pipe 2654. That is, the second fixing member 2132 is located at the steering-shaft-lower portion 2652a. The second fixing member 2132 retains the second inner pipe 2653b inside the outer pipe 2654 by applying a fastening force to an upper end portion of the outer pipe 2654 in the radial direction.

A structure of the second fixing member 2132 may be a structure that generates the fastening force by fastening a bolt or a structure that generates the fastening force by using the principle of leverage with a lever operation. That is, the second fixing member 2132 may have any structure as long as the second inner pipe 2653b is capable of being fixed to the outer pipe 2654.

As illustrated in FIG. 19, in the steering shaft 2652 having the structure described above, the length of the steering-shaft-upper portion 2652c is changeable by changing the length of the first inner pipe 2653a in the axial direction, and the length of the steering-shaft-lower portion 2652a is changeable by changing the position of the second inner pipe 2653b with respect to the outer pipe 2654. That is, the steering shaft 2652 includes a handle adjusting mechanism 2013 capable of adjusting the position of the handlebar 651 by extending and contracting the steering-shaft-upper portion 2652c in the axial direction of the inner pipe 2653 and extending and contracting the steering-shaft-lower portion 2652a in the direction in which the intermediate steering axis Z extends.

As illustrated in FIG. 19, since the steering shaft 2652 includes the handle adjusting mechanism 2013 as described above, it is possible to change the handle height H that is a distance in the top-bottom direction of the vehicle body frame from the midpoint M between the left front wheel 31 and the right front wheel 32 in the left-right direction of the vehicle body frame to the grip 651a of the handlebar 651. The definition of the handle height H is the same as that of the handle height H in the embodiment described above.

In addition, since the steering shaft 2652 includes the handle adjusting mechanism 2013 as described above, the offset amount of the handlebar 651 with respect to the intermediate steering axis Z of the steering shaft 2652 can be changed in the front-rear direction of the vehicle body frame. The offset amount is the distance I between the upper end of the grip 651a and the extension line of the intermediate steering axis Z when the vehicle body frame is seen from the left.

As described above, it is possible to enhance operational feeling of the handlebar 651 in a speed range from the stationary state to the extremely low speed of the front two-wheel leaning vehicle by adjusting the handle height H and the offset amount.

In the embodiment, the front two-wheel leaning vehicle 1 includes, as a handle, the rod-shaped handlebar 651 extending in the left-right direction of the vehicle body frame 21. Alternatively, the front two-wheel leaning vehicle may include a handle with another structure, such as a separate-type handle including a left separate handle and a right separate handle.

In the embodiment, the left coupling member 812 of the left-foot-load-transfer part 81 is coupled to the left side member 53 of the linkage mechanism 5. The right coupling member 822 of the right-foot-load-transfer part 82 is coupled to the right side member 54 of the linkage mechanism 5.

Alternatively, the left coupling member may be coupled to a member other than the left side member 53 as long as the left coupling member is coupled to the left portion 5a located at the left of the head pipe 211 in the linkage mechanism 5 in the left-right direction of the vehicle body frame. That is, the left coupling member only needs to be coupled to the left portion of the linkage mechanism. The right coupling member may be coupled to a member other than the right side member 54 as long as the right coupling member is coupled to the right portion 5b located at the right of the head pipe 211 in the linkage mechanism 5 in the left-right direction of the vehicle body frame. That is, the right coupling member only needs to be coupled to the right portion of the linkage mechanism.

The left coupling member may be coupled to a right portion of the linkage mechanism including the right side member. The right coupling member may be coupled to a left portion of the linkage mechanism including the left side member.

In the embodiment, the steering shaft 652 includes the inner pipe 653 and the outer pipe 654. Alternatively, the steering shaft may include pipes of the same size as long as the handle height H and the offset amount are adjustable by the handle adjusting mechanism.

The steering shaft may include a plurality of types of pipes having different sizes.

In the embodiment, a lower portion of the inner pipe 653 is located inside an upper portion of the outer pipe 654. Alternatively, an upper portion of the inner pipe may be located inside a lower portion of the outer pipe.

In the embodiment, the steering shaft 652 includes the steering-shaft-lower portion 652a, the steering-shaft-bent portion 652b, and the steering-shaft-upper portion 652c. Alternatively, the steering shaft may have a shape having no steering-shaft-bent portion such as a shape extending along the intermediate steering axis as long as the handle height H and the offset amount are adjustable.

In the embodiment, the first spacer 101, the second spacer 102, and the third spacer 103 are spherical. Alternatively, at least one of the first spacer, the second spacer, or the third spacer may have another shape such as a columnar shape or a conic shape.

The front two-wheel leaning vehicle may include at least one of the first spacer, the second spacer, or the third spacer or may include none of the first spacer, the second spacer, and the third spacer.

In the embodiment, the linkage mechanism 5 includes the upper cross member 51 located at the rear of the head pipe 211. Alternatively, the linkage mechanism may include a front-upper-cross member at the front of a rear-upper-cross member and the head pipe.

In the embodiment, the linkage mechanism 5 includes the upper cross member 51 and the lower cross member 52 whose intermediate portions in the left-right direction of the vehicle body frame 21 are rotatably supported by the head pipe 211. Alternatively, the upper cross member may include a left-upper-cross member whose right end portion is rotatably supported by the head pipe and a right-upper-cross member whose left end portion is rotatably supported by the head pipe. At least one of the front-lower-cross member or the rear-lower-cross member in the lower cross member may include a left-lower-cross member whose right end portion is rotatably supported by the head pipe and a right-lower-cross member whose left end portion is rotatably supported by the head pipe. The linkage mechanism may be a linkage mechanism of a left and right independent suspension type. Specifically, the linkage mechanism may include a left arm portion located at the left of the head pipe in the left-right direction of the vehicle body frame when the vehicle body frame is seen from the front and rotatably supported by the head pipe, and a right arm portion located at the right of the head pipe in the left-right direction of the vehicle body frame when the vehicle body frame is seen from the front and rotatably supported by the head pipe. A left side member is rotatably connected to the left arm portion and a right side member is rotatably connected to the right arm portion.

In the embodiment, the restriction mechanism 9 includes the stopper part 92 that holds the plate-shaped rotation part 91 in the thickness direction and applies a friction force to the rotation part 91. Alternatively, the restriction mechanism may have any configuration as long as leftward or rightward leaning of the front two-wheel leaning vehicle can be restricted.

In the embodiment, the front-wheel-braking mechanism 11 includes the front-wheel-brake discs 111 and the front-wheel-brake calipers 112. Alternatively, the front-wheel-braking mechanism may have any configuration as long as a braking force is applied to the pair of left and right front wheels. In the embodiment, the front-wheel-braking mechanism 11 is actuated by a hydraulic pressure, but may be actuated by other techniques (e.g., wires) other than the hydraulic pressure.

In the embodiment, the rear-wheel-braking mechanism 12 includes the rear-wheel-brake disc 121 and the rear-wheel-brake caliper 122. Alternatively, the rear-wheel-braking mechanism may have any configuration as long as a braking force is applied to the rear wheel. In the embodiment, the rear-wheel-braking mechanism 12 is actuated by the rear-wheel-brake wire 123, but may be actuated by other techniques (e.g., hydraulic pressure) other than wires.

In the embodiment, the front two-wheel leaning vehicle 1 includes the interlocking mechanism 16 that interlocks the restriction mechanism 9 and the rear-wheel-braking mechanism 12 with each other by operating the lean lock lever 93. Alternatively, the interlocking mechanism may interlock the restriction mechanism and the front-wheel-braking mechanism with each other. The configuration of the interlocking mechanism is not limited to the configuration described above, and may be other configurations. The front two-wheel leaning vehicle may not include an interlocking mechanism.

DESCRIPTION OF REFERENCE CHARACTERS 1 front two-wheel leaning vehicle
2 vehicle body
3 front wheel
4 rear wheel
5 linkage mechanism
5a left portion
5b right portion
6 steering mechanism
8 load transfer mechanism
9 restriction mechanism
11 front-wheel-braking mechanism
12 rear-wheel-braking mechanism
13, 1013, 2013 handle adjusting mechanism
14 meter (terminal)
15 throttle device (terminal)
16 interlocking mechanism
17 lock mechanism
18 controller (electric component)
21 vehicle body frame
22 power unit
31 left front wheel
32 right front wheel
41 wheel shaft
51 upper cross member
52 lower cross member
53 left side member
54 right side member
61 left suspension part
62 right suspension part
65 steering member
66 steering-force-transfer mechanism
81 left-foot-load-transfer part
82 right-foot-load-transfer part
83 left-right coupling member
91 rotation part
92 stopper part
93 lean lock lever
94 lean lock wire
101 first spacer
102 second spacer
103 third spacer
131, 1131 fixing member
141 body
141a display surface
142 power-supply-operation section
143 vehicle-state-display section
144 battery-remaining-capacity-display section
145 vehicle-speed-display section
146 lean-lock-display section
149 signal line
149a curl cord
151 throttle lever
151a pressing part
152 throttle-lever-support part
159 signal line
159a curl cord
161 first equalizer
162 second equalizer
163 interlock brake wire
211 head pipe (linkage support part)
212 main frame
213 upper frame
214 under frame
221 battery
521 front-lower-cross part (front cross part)
522 rear-lower-cross part (rear cross part)
523 lower-cross-coupling part
524 lower-cross-coupling part
651 handlebar
651a grip
652, 1652, 2652 steering shaft
652a, 1652a, 2652a steering-shaft-lower portion
652b, 1652b, 2652b steering-shaft-bent portion
652c, 1652c, 2652c steering-shaft-upper portion
653, 1653, 2653 inner pipe
654, 1654, 2654 outer pipe
669 tie rod
811 left-foot-placing part
812 left coupling member
821 right-foot-placing part
822 right coupling member
941 first-lean-lock wire
942 second-lean-lock wire
2131 first fixing member
2132 second fixing member
X left steering axis
Y right steering axis
Z intermediate steering axis
UI upper-intermediate-coupling axis
UL upper-left-coupling axis
UR upper-right-coupling axis
DI lower-intermediate-coupling axis (intermediate axis)
DL lower-left-coupling axis (left axis)
DR lower-right-coupling axis (right axis)
P rotation axis
H handle height
I distance (offset amount)

The invention claimed is:
1. A front two-wheel leaning vehicle configured to lean leftward when turning left and lean rightward when turning right, the front two-wheel leaning vehicle comprising:
a vehicle body frame, including a head pipe in a front portion of the front two-wheel leaning vehicle;
a left front wheel located left of the vehicle body frame in a left-right direction of the vehicle body frame;
a right front wheel located right of the vehicle body frame in the left-right direction of the vehicle body frame;

a handle having a grip configured to be held by a driver riding on the front two-wheel leaning vehicle;

a steering shaft connected to the handle and rotatably inserted in the head pipe, such that the steering shaft is rotatable about a rotation axis, the steering shaft being configured to rotate about the rotation axis together with the handle to steer the left front wheel and the right front wheel;

a rear wheel located behind the left front wheel and the right front wheel in a front-rear direction of the vehicle body frame;

a linkage mechanism disposed around the head pipe and configured to allow leftward leaning and rightward leaning in the left-right direction of the vehicle body frame, the linkage mechanism having a left portion and a right portion; and a load transfer mechanism including
　a left-foot-placing part located between the left front wheel and the rear wheel, for a left foot of the driver to be placed thereon,
　a left coupling member configured to couple the left-foot-placing part and the left portion of the linkage mechanism to each other, or to couple the left-foot-placing part and the right portion of the linkage mechanism to each other,
　a right-foot-placing part located between the right front wheel and the rear wheel, for a right foot of the driver to be placed thereon, and
　a right coupling member configured to couple the right-foot-placing part and the right portion of the linkage mechanism to each other, or to couple the right-foot-placing part and the left portion of the linkage mechanism to each other, the load transfer mechanism being configured
　to transfer a load to the left portion of the linkage mechanism through the left-foot-placing part by the left coupling member that couples the left-foot-placing part and the left portion of the linkage mechanism to each other, and
　to transfer a load to the right portion of the linkage mechanism through the right-foot-placing part by the right coupling member that couples the right-foot-placing part and the right portion of the linkage mechanism to each other,
or
　to transfer the load to the left portion of the linkage mechanism through the right-foot-placing part by the right coupling member that couples the right-foot-placing part and the left portion of the linkage mechanism to each other, and
　to transfer the load to the right portion of the linkage mechanism through the left-foot-placing part by the left coupling member that couples the left-foot-placing part and the right portion of the linkage mechanism to each other, wherein the steering shaft includes a handle adjusting mechanism configured to adjust, with respect to the left-foot-placing part and the right-foot-placing part, at least one of
　a handle height, which is a distance, in a top-bottom direction of the vehicle body frame, from a midpoint between the left front wheel and the right front wheel in the left-right direction of the vehicle body frame, to the grip, or
　an offset amount of the handle with respect to the rotation axis of the steering shaft in the front-rear direction of the vehicle body frame.

2. The front two-wheel leaning vehicle according to claim 1, wherein
　the handle adjusting mechanism adjusts at least one of the handle height or the offset amount by changing at least one of
　　a length of the steering shaft in the top-bottom direction of the vehicle body frame, or
　　a length of the steering shaft in the front-rear direction of the vehicle body frame.

3. The front two-wheel leaning vehicle according to claim 2, wherein the steering shaft includes
　a steering-shaft-lower portion rotatably supported by the head pipe and extending from the head pipe both upward, in the top-bottom direction of the vehicle body frame, and rearward, in the front-rear direction of the vehicle body frame, along the rotation axis,
　a steering-shaft-bent portion bent forward, in the front-rear direction of the vehicle body frame, and upward, in the top-bottom direction of the vehicle body frame, with respect to the steering-shaft-lower portion, and
　a steering-shaft-upper portion extending from the steering-shaft-bent portion forward in the front-rear direction of the vehicle body frame and upward in the top-bottom direction of the vehicle body frame,
　the handle is connected to an upper end of the steering-shaft-upper portion, and
　the handle adjusting mechanism is configured to change a length of at least one of the steering-shaft-upper portion or the steering-shaft-lower portion.

4. The front two-wheel leaning vehicle according to claim 1, further comprising:
　an electric component attached to the vehicle body frame;
　a terminal attached to the handle; and
　a wire including a curl cord located inside the steering shaft and electrically connecting the terminal and the electric component to each other.

5. The front two-wheel leaning vehicle according to claim 1, further comprising:
　a left suspension part having an upper portion and a lower portion, the lower portion thereof supporting the left front wheel; and
　a right suspension part having an upper portion and a lower portion, the lower portion thereof supporting the right front wheel, wherein
　the linkage mechanism includes
　　a left side member coupled to the upper portion of the left suspension part, such that the upper portion of the left suspension part is rotatable about a left steering axis, the left steering axis extending in the top-bottom direction of the vehicle body frame,
　　a right side member coupled to the upper portion of the right suspension part, such that the upper portion of the right suspension part is rotatable about a right steering axis, the right steering axis being parallel to the left steering axis, and
　　a lower cross member, having
　　　a front cross part located, in the front-rear direction of the vehicle body frame, in front of the head pipe, the left side member, and the right side member, the front cross part having a left end portion, a right end portion and an intermediate portion, and
　　　a rear cross part located, in the front-rear direction of the vehicle body frame, behind the head pipe, the left side member, and the right side member, the rear cross part having a left end portion, a right end portion and an intermediate portion, wherein the left side member is coupled to the left end portion of the front cross part and the left end portion of the rear cross part, such that the left side member is rotatable about a left axis extending in the front-rear direction of the vehicle body frame, the right side member is coupled to the right end portion of the front cross part and the right end portion of the rear cross part, such that the right side member is rotatable about a right axis parallel to the left axis, and the intermediate portions of the front cross part and of the rear cross part are supported by the head pipe, such that the intermediate portions are rotatable about an intermediate axis parallel to the left axis and the right axis.

6. The front two-wheel leaning vehicle according to claim 1, further comprising:

a vehicle-state-display section attached to the handle, the vehicle-state-display section being configured to display a vehicle state of the front two-wheel leaning vehicle in color.

\* \* \* \* \*